US012592485B2

(12) United States Patent
Liu et al.

(10) Patent No.: US 12,592,485 B2

(45) Date of Patent: Mar. 31, 2026

(54) ANTENNA SYSTEM, RF COMMUNICATION DEVICE, AND METHOD OF OPERATING THE SAME

(71) Applicant: Telefonaktiebolaget LM Ericsson (publ), Stockholm (SE)

(72) Inventors: Haitao Liu, Beijing (CN); Chenglong Yin, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 286 days.

(21) Appl. No.: 18/274,237

(22) PCT Filed: Jan. 28, 2021

(86) PCT No.: PCT/CN2021/074096

§ 371 (c)(1),
(2) Date: Jul. 26, 2023

(87) PCT Pub. No.: WO2022/160163

PCT Pub. Date: Aug. 4, 2022

(65) Prior Publication Data

US 2024/0088558 A1 Mar. 14, 2024

(51) Int. Cl.

| | |
|---|---|
| ***H01Q 3/36*** | (2006.01) |
| ***H01Q 1/24*** | (2006.01) |
| ***H01Q 21/06*** | (2006.01) |

(52) U.S. Cl.

CPC ............... *H01Q 3/36* (2013.01); *H01Q 1/246* (2013.01); *H01Q 21/061* (2013.01)

(58) Field of Classification Search

CPC ........ H01Q 3/36; H01Q 1/246; H01Q 21/061; H01Q 21/06

See application file for complete search history.

(56) References Cited

U.S. PATENT DOCUMENTS

| | | | |
|---|---|---|---|
| 10,181,657 | B2 | 1/2019 | Ai et al. |
| 10,649,081 | B2 | 5/2020 | Rincon et al. |

(Continued)

FOREIGN PATENT DOCUMENTS

| | | | |
|---|---|---|---|
| CN | 102751592 | A | 10/2012 |
| CN | 104868233 | A | 8/2015 |

(Continued)

OTHER PUBLICATIONS

International Search Report and Written Opinion of the International Searching Authority, PCT/CN2021/074096, mailed Oct. 14, 2021, 10 pages.

(Continued)

*Primary Examiner* — Hai V Tran

(74) *Attorney, Agent, or Firm* — Sage Patent Group

(57) ABSTRACT

The present disclosure is related to an antenna system, a radio frequency (RF) communication device including the same, and a method of operating the same. The antenna system includes an antenna array including one or more sub-arrays of antenna elements in which at least one sub-array being operable in more than one state; a state switching circuit electrically coupled to the at least one sub-array and configured to drive the at least one sub-array to operate in a first state in which an upper side lobe of the antenna array is suppressed for a first beam tilting range or in a second state in which an upper side lobe of the antenna array is suppressed for a second beam tilting range which is different from the first beam tilting range.

19 Claims, 17 Drawing Sheets

(56) References Cited

U.S. PATENT DOCUMENTS

| | | | | |
|---|---|---|---|---|
| 10,714,840 | B1 | 7/2020 | West et al. | |
| 2005/0012665 | A1 * | 1/2005 | Runyon .................. | H01Q 3/40 455/562.1 |
| 2007/0132634 | A1 * | 6/2007 | Wakeman ............... | G01S 13/44 342/194 |
| 2011/0248796 | A1 * | 10/2011 | Pozgay .................. | H01Q 25/02 333/137 |
| 2017/0195018 | A1 * | 7/2017 | Ma ......................... | H01Q 25/00 |
| 2019/0103672 | A1 * | 4/2019 | Jackson .................. | H03H 7/20 |

FOREIGN PATENT DOCUMENTS

| | | | |
|---|---|---|---|
| WO | 2012126439 | A2 | 9/2012 |
| WO | 2019179617 | A1 | 9/2019 |

OTHER PUBLICATIONS

European Search Report and Opinion for European Patent Application No. 21921783.3 mailed Sep. 26, 2024, 8 pages.

* cited by examiner

Mechanical Tilt

Electrical Tilt (a) 6x1 Configuration (b) 4x1 Configuration

1-In-1-Out Junctions

670

680

1-In-2-Out Junctions (a)

(b)

(a)

(b)

ANTENNA SYSTEM, RF COMMUNICATION DEVICE, AND METHOD OF OPERATING THE SAME

CROSS REFERENCE TO RELATED APPLICATIONS

This application is a 35 U.S.C. § 371 national stage application of PCT International Application No. PCT/CN2021/074096 filed on Jan. 28, 2021, the disclosure and content of which is incorporated by reference herein in its entirety.

TECHNICAL FIELD

The present disclosure is related to the field of antenna technology, and in particular, to an antenna system, a radio frequency (RF) communication device comprising the same, and a method of operating the same.

BACKGROUND

With the development of the electronic and telecommunications technologies, RF communication devices, such as a base station, an access point, an eNode B (eNB), a gNB, becomes an important part of our daily lives. As an important component of an RF communication device, an antenna or antenna system is the interface between radio waves propagating through space and electric currents moving in metal conductors, used with a transmitter or receiver.

The energy radiated by an antenna can be represented by a radiation pattern of the antenna. For example, FIG. 1 is a diagram illustrating an exemplary horizontal radiation pattern and an exemplary vertical radiation pattern of an antenna. As shown in FIG. 1, the radiation patterns of the antenna may have a main lobe, multiple side lobes and a back lobe.

The major part of the radiated field, which covers a larger area, is the main lobe or major lobe. This is the portion where maximum radiated energy exists. The direction of this lobe indicates the directivity of the antenna. The other parts of the pattern where the radiation is distributed sideward are known as side lobes or minor lobes. These are the areas where the power is wasted. There is a special side lobe, which is exactly opposite to the direction of main lobe. It is known as back lobe, which is also a minor lobe. A considerable amount of energy is wasted even here.

Further, as can be seen from the vertical pattern of the antenna in FIG. 1, there is an upper side lobe pointing to the sky, which could also result in a considerable amount of wasted energy since the RF communication device typically does not communicate with objects in the sky, especially in a cellular network. Further, an upper side lobe of an antenna system at a cell may also cause inter-cell interference to another neighboring cell. Therefore, to improve the efficiency of frequency reuse and reduce the intra-frequency interference with neighbor cells, for shaped-beam antenna, the upper side lobe that radiates neighbor cells should be lowered to improve the ratio of strength of useful signal to that of interference signal.

SUMMARY

According to an aspect of the present disclosure, an antenna system is provided. The antenna system comprises: an antenna array comprising one or more sub-arrays of antenna elements in which at least one sub-array being operable in more than one state; a state switching circuit electrically coupled to the at least one sub-array and configured to drive the at least one sub-array to operate in a first state in which an upper side lobe of the antenna array is suppressed for a first beam tilting range or in a second state in which an upper side lobe of the antenna array is suppressed for a second beam tilting range which is different from the first beam tilting range.

In some embodiments, the state switching circuit comprises: a bias-T has a first terminal electrically coupled to a driver integrated chip (IC) to receive a control signal from the driver IC, a second terminal electrically coupled to a transceiver to receive/transmit a radio frequency (RF) signal from/to the transceiver, and a third terminal electrically coupled to a first terminal of a phase tuning circuit to communicate the control signal and the RF signal with the phase tuning circuit; and the phase tuning circuit having the first terminal electrically coupled to the third terminal of the bias-T and one or more second terminals electrically coupled to each of the antenna elements of the at least one sub-array, respectively, wherein the phase tuning circuit is configured to tune the phase of the RF signal, which passes through the phase tuning circuit, based on the control signal.

In some embodiments, the phase tuning circuit comprises one or more first phase tuning modules, wherein each of the first phase tuning modules has two terminals and configured to communicate the RF signal with its phase tuned based on the control signal received from one of the two terminals.

In some embodiments, a first phase tuning module comprises: a first PIN diode having a first terminal electrically coupled to a first terminal of an inductor and a second terminal serving as the terminals of the first phase tuning module; a first stub having a first terminal electrically coupled to the first terminal of the first PIN diode and a second terminal floated; a second PIN diode having a first terminal electrically coupled to the first terminal of the inductor and a second terminal electrically coupled to the second terminal of the first PIN diode; a second stub having a first terminal electrically coupled to the first terminal of the second PIN diode and a second terminal floated; and the inductor having the first terminal electrically coupled to the first terminal of the first PIN diode and the first terminal of the second PIN diode and a second terminal electrically coupled to the ground.

In some embodiments, a first phase tuning module comprises: a first PIN diode having a first terminal electrically coupled to a first terminal of a first stub and a second terminal serving as the terminals of the first phase tuning module; and the first stub having the first terminal electrically coupled to the first terminal of the first PIN diode and a second terminal floated.

In some embodiments, a first phase tuning module comprises: a first PIN diode having a first terminal serving as one terminal of the first phase tuning module and a second terminal serving as the other terminal of the first phase tuning module; a first signal path having a first terminal electrically coupled to the first terminal of the first PIN diode and a second terminal electrically coupled to a second terminal of a second PIN diode; a second signal path having a first terminal electrically coupled to the second terminal of the first PIN diode and a second terminal electrically coupled to a first terminal of the second PIN diode; and the second PIN diode having the first terminal electrically coupled to the second terminal of the second signal path and the second terminal electrically coupled to the second terminal of the first signal path.

In some embodiments, a first phase tuning module comprises: a first PIN diode having a first terminal serving as one terminal of the first phase tuning module and a second terminal serving as the other terminal of the first phase tuning module; and a first bridging conductor trace having a first terminal electrically coupled to the first terminal of the first PIN diode and a second terminal electrically coupled to the second terminal of the first PIN diode.

In some embodiments, a first phase tuning module comprises: a first PIN diode having a first terminal electrically coupled to a first terminal of a first signal path and a second terminal serving as one terminal of the first phase tuning module; the first signal path having the first terminal electrically coupled to the first terminal of the first PIN diode and a second terminal electrically coupled to a first terminal of a second PIN diode; the second PIN diode having the first terminal electrically coupled to the second terminal of the first signal path and a second terminal serving as the other terminal of the first phase tuning module; a third PIN diode having a first terminal electrically coupled to the second terminal of the first PIN diode and a second terminal electrically coupled to a first terminal of a second signal path; and the second signal path having the first terminal electrically coupled to the second terminal of the third PIN diode and a second terminal electrically coupled to a second terminal of a fourth PIN diode; the fourth PIN diode having a first terminal electrically coupled to the second terminal of the second PIN diode and the second terminal electrically coupled to the second terminal of the second signal path.

In some embodiments, a first phase tuning module comprises: a first PIN diode having a first terminal electrically coupled to a first terminal of a first signal path and a second terminal serving as one terminal of the first phase tuning module; the first signal path having the first terminal electrically coupled to the first terminal of the first PIN diode and a second terminal serving as the other terminal of the first phase tuning module; a second PIN diode having a first terminal electrically coupled to the second terminal of the first PIN diode and a second terminal electrically coupled to a first terminal of the second signal path; and the second signal path having the first terminal electrically coupled to the second terminal of the second PIN diode and a second terminal electrically coupled to the second terminal of the first signal path.

In some embodiments, the phase tuning circuit comprises one or more second phase tuning modules, wherein each of the second phase tuning modules has three terminals and configured to communicate the RF signal with its phase tuned based on the control signal received from one of the three terminals.

In some embodiments, a second phase tuning module comprises: a first PIN diode having a first terminal electrically coupled to a first terminal of a first signal path and a second terminal serving as a first terminal of the second phase tuning module; the first signal path having a first terminal electrically coupled to the first terminal of the first PIN diode and a second terminal serving as a second terminal of the second phase tuning module; a second PIN diode having a first terminal electrically coupled to the second terminal of the first PIN diode and a second terminal electrically coupled to a first terminal of a second signal path; the second signal path having the first terminal electrically coupled to the second terminal of the second PIN diode and a second terminal serving as a third terminal of the second phase tuning module; and a third signal path having a first terminal electrically coupled to the first terminal of the second signal path and a second terminal electrically coupled to the first terminal of the first signal path.

In some embodiments, a second phase tuning module comprises: a first PIN diode having a first terminal electrically coupled to a first terminal of a first signal path and a second terminal serving as a first terminal of the second phase tuning module; the first signal path having the first terminal electrically coupled to the first terminal of the first PIN diode and a second terminal serving as a second terminal of the second phase tuning module; a second PIN diode having a first terminal electrically coupled to a first terminal of a second signal path and a second terminal electrically coupled to the second terminal of the first PIN diode; the second signal path having the first terminal electrically coupled to the first terminal of the second PIN diode and a second terminal serving as a third terminal of the second phase tuning module; a third signal path having a first terminal electrically coupled to the first terminal of the first PIN diode and a second terminal electrically coupled to a first terminal of a first capacitor; the first capacitor having the first terminal electrically coupled to the second terminal of the third signal path and a second terminal electrically coupled to a first terminal of a fifth signal path; a fourth signal path having a first terminal electrically coupled to the first terminal of the second PIN diode and a second terminal electrically coupled to a second terminal of a second capacitor; the second capacitor having a first terminal electrically coupled to a second terminal of the fifth signal path and the second terminal electrically coupled to the second terminal of the fourth signal path; the fifth signal path having the first terminal electrically coupled to the second terminal of the first capacitor and the second terminal electrically coupled to the first terminal of the second capacitor; a first inductor having a first terminal electrically coupled to a first voltage signal terminal and a second terminal electrically coupled to the second terminal of the first signal path; a second inductor having a first terminal electrically coupled to a third voltage signal terminal and a second terminal electrically coupled to the second terminal of the second signal path; a third PIN diode having a first terminal electrically coupled to a second terminal of a third conductor and a second terminal electrically coupled to the second terminal of the first PIN diode; and the third inductor having a first terminal electrically coupled to a second voltage signal terminal and the second terminal electrically coupled to the second terminal of the third PIN diode.

In some embodiments, the phase tuning circuit is composed of one or more first phase tuning modules, one or more second phase tuning modules, or a combination thereof. In some embodiments, the third terminal of the bias-T is electrically coupled to the first terminal of the phase tuning circuit through a board-to-board connector.

In some embodiments, the sub-arrays of the antenna array are electrically coupled to the driver IC through a first number of bias-T with one driver IC for one sub-array. In some embodiments, the sub-arrays of the antenna array are electrically coupled to the driver IC through a second number of bias-T with one driver IC for multiple sub-arrays. In some embodiments, the sub-arrays of the antenna array are electrically coupled to the driver IC through a first number of bias-T with one bias-T for one sub-array. In some embodiments, the sub-arrays of the antenna array are electrically coupled to the driver IC through a second number of bias-T with one bias-T for multiple sub-arrays.

In some embodiments, a sub-array comprises four antenna elements in a 4×1 form and any two adjacent antenna elements are electrically coupled to each other, wherein a first phase tuning module is electrically coupled between a first terminal of one of the middle two antenna elements and a first terminal of the other of the middle two antenna elements, and another first phase tuning module is electrically coupled between a second terminal of the one of the middle two antenna elements and a second terminal of the other of the middle two antenna elements.

In some embodiments, a sub-array comprises four antenna elements in a 4×1 form and any two adjacent antenna elements are electrically coupled to each other, wherein a first phase tuning module is electrically coupled between a first terminal of one of the middle two antenna elements and a first terminal of the other of the middle two antenna elements, and another first phase tuning module is electrically coupled between a second terminal of the one of the middle two antenna elements and a second terminal of the other of the middle two antenna elements.

In some embodiments, a sub-array comprises three antenna elements in a 3×1 form and any two adjacent antenna elements are electrically coupled to each other, wherein a first phase tuning module is electrically coupled between a first terminal of the middle antenna element and a first terminal of an end antenna element, and another first phase tuning module is electrically coupled between a second terminal of the middle antenna element and a second terminal of the end antenna element.

In some embodiments, a sub-array comprises two antenna elements in a 2×1 form and the two antenna elements are electrically coupled to each other, wherein a first phase tuning module is electrically coupled between a first terminal of one of the two antenna elements and a first terminal of the other of the two antenna elements, and another first phase tuning module is electrically coupled between a second terminal of the one of the two antenna elements and a second terminal of the other of the two antenna elements.

In some embodiments, a sub-array comprises two antenna elements in a 2×1 form and the two antenna elements are electrically coupled to each other, wherein a first phase tuning module is electrically coupled between a first terminal of one of the two antenna elements and a first terminal of the other of the two antenna elements, and another first phase tuning module is electrically coupled between a second terminal of the one of the two antenna elements and a second terminal of the other of the two antenna elements.

In some embodiments, the antenna array has a reconfigurable radiation aperture. In some embodiments, the antenna system further comprises: a controller electrically coupled to the driver IC and configured to drive the driver IC to provide the control signal via a digital I/O. In some embodiments, the state switching circuit is further configured to drive the at least one sub-array to operate in one or more additional states in which an upper side lobe of the antenna array is suppressed for one or more additional beam tilting ranges which are different from the first and second beam tilting ranges. In some embodiments, the first terminal of any of the PIN diodes is an anode while the second terminal of any of the PIN diodes is a cathode.

According to a second aspect of the present disclosure, an RF communication device is provided. The RF communication device comprises: an antenna system according to any of the first aspect; a transceiver electrically coupled to the antenna system and configured to transmit/receive an RF signal to/from the antenna system; and a processor electrically coupled to the antenna system and the transceiver and configured to coordinate the antenna system and the transceiver to suppress its upper side lobe based on a beam tilting range intended by the transceiver.

According to a third aspect of the present disclosure, a method of operating an antenna system of any of the first aspect is provided. The method comprises: inputting, to the state switching circuit of the antenna system, a first control signal, to drive the antenna array of the antenna system to operate in the first state in response to determining that a first beam tilting range is required; and inputting, to the state switching circuit of the antenna system, a second control signal which is different from the first control signal, to drive the antenna array of the antenna system to operate in the second state in response to determining that a second beam tilting range is required.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and therefore are not to be considered limiting of its scope, the disclosure will be described with additional specificity and detail through use of the accompanying drawings.

DETAILED DESCRIPTION

Figure 1:
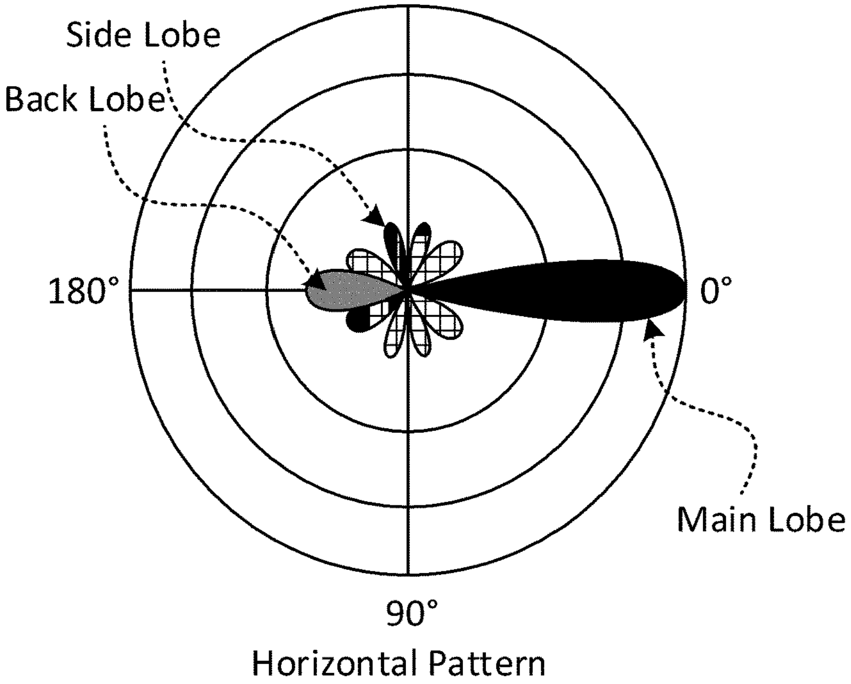
FIG. 1 is a diagram illustrating an exemplary horizontal radiation pattern and an exemplary vertical radiation pattern of an antenna.
Figure 1:
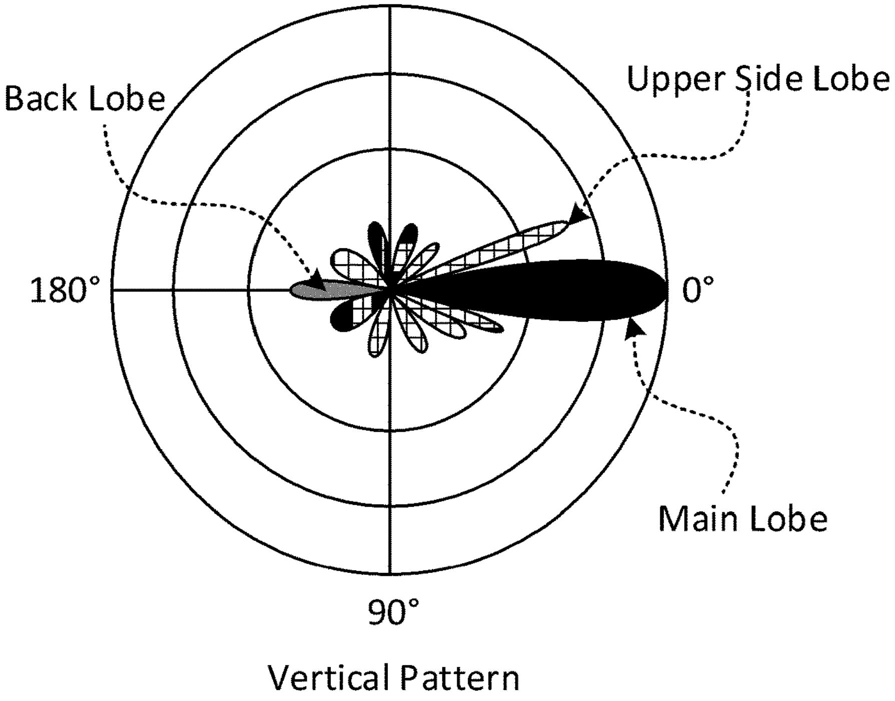

Hereinafter, the present disclosure is described with reference to embodiments shown in the attached drawings. However, it is to be understood that those descriptions are just provided for illustrative purpose, rather than limiting the present disclosure. Further, in the following, descriptions of known structures and techniques are omitted so as not to unnecessarily obscure the concept of the present disclosure.

Those skilled in the art will appreciate that the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. It will be also understood that the terms "connect(s)," "connecting", "connected", etc. when used herein, just means that there is an electrical or communicative connection between two elements and they can be connected either directly or indirectly, unless explicitly stated to the contrary.

Conditional language used herein, such as "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below. In addition, language such as the phrase "at least one of X, Y and Z," unless specifically stated otherwise, is to be understood with the context as used in general to convey that an item, term, etc. may be either X, Y, or Z, or a combination thereof.

Of course, the present disclosure may be carried out in other specific ways than those herein set forth without departing from the scope and essential characteristics of the disclosure. One or more of the specific processes discussed below may be carried out in any communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure will be illustrated in the accompanying Drawings and described in the following Detailed Description, it should be understood that the disclosure is not limited to the described embodiments, but instead is also capable of numerous rearrangements, modifications, and substitutions without departing from the present disclosure that as will be set forth and defined within the claims.

Further, please note that although the following description of some embodiments of the present disclosure is given in the context of RF communication technology, the present disclosure is not limited thereto.

Due to advent of more and more wireless cellular technologies and use of the cellular networks by large number of mobile phones have initiated concerns to increase the network capacity. RF engineers have developed the techniques known as frequency reuse and spatial isolation. Initially frequency reuse was available for omnidirectional antennas, and was creating inter cell interference. After the advent of sector array antenna, frequency re-use has become more efficient yielding the better cell capacity within a cell. However, they have drawbacks of increase in inter cell interference.

Spatial isolation can be achieved by focusing the beam in a particular region and hence increase the cell capacity by providing the service to mobile users in different regions using different selective beams. However, the spread of radiation pattern of antenna will have adverse effect in adjacent sectors of the same cell as well as adjacent cells. This effect leads to degradation in the quality of service requirement of the cells. As a solution to this, concept of down-tilting has been tried by RF engineers.

Figure 2:
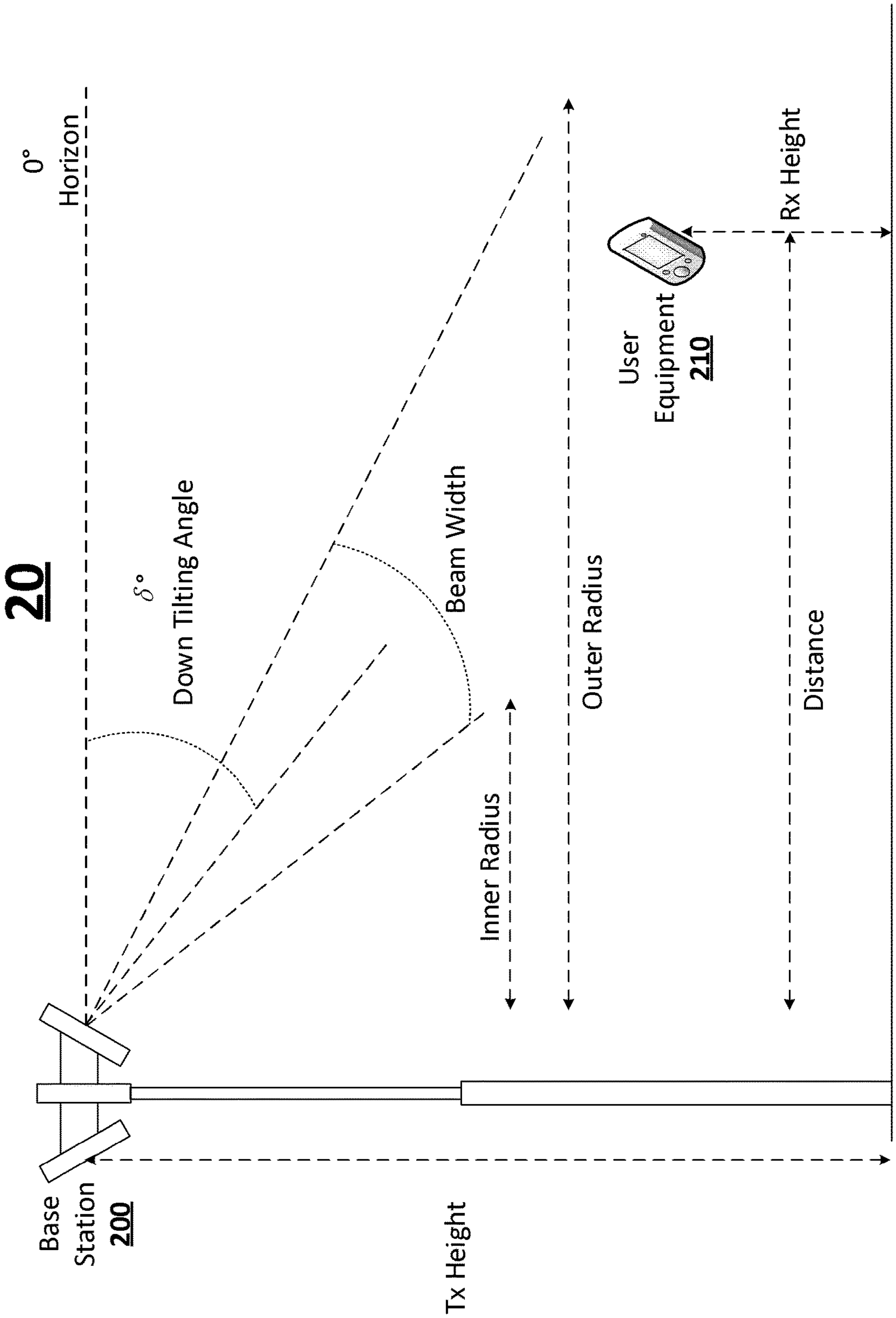
FIG. 2 is a diagram illustrating an exemplary scenario in which an antenna system according to an embodiment of the present disclosure may be applicable.

The down-tilting is depicted in FIG. 2. Mechanical tilting means physically or manually down-tilting the antenna, as explicitly shown in FIG. 2. As shown in FIG. 2, the main lobe of a base station 200 may be down tilted by a down tilting angle of 8°. With the down tilting, the inter-cell/sector interference caused by the main lobe and the upper side lobe may be significantly reduced. The down tilting angle of 8° for serving the UE 210 with the best transmission/reception quality may be roughly calculated according to the following equation:

$$\delta^\circ = \arctan\left(\frac{\text{Height of } BS - \text{Height of } UE}{\text{Distance between } BS \text{ and } UE}\right)$$

Further, given a certain beam width of the main lobe, the coverage of the base station 200 may be located between the inner radius and the outer radius and may be determined based on the down tilting angle.

This type has drawbacks as will be described with reference to FIG. 3. Due to these drawbacks, electrical tilt has been invented by the RF and system engineers. Electrical tilt does not involve any physical movement but changes the phases of the radiation pattern of individual antennas used in sector array antenna. Electrical tilt can also provide the gain to support concept known as beamforming to extend the coverage.

Till today, RF engineers has been using mechanical tilt method to alter the position of the RF antenna. However, as depicted in FIG. 3, antenna in this method tilts only one plane (for example, the horizontal plane 305 is tilted to the plane 320 in which the main lobe 325 and the back lobe 330 are shown). Moreover when the front part (i.e. the main lobe 325) is tilted down to decrease the gain on horizon, the back side (i.e., the back lobe 330) is tilted upside. This results into change in front to back ratio as well as increase in inter sector interference. Further, mechanical tilt results into pattern blooming where the signal is reduced more at bore sight and less at angles away from bore sight.

Electrical tilt concept has provided great amount of control to shape the radiation pattern of antenna and boost the pattern as desired. This has made life of cellular operators very easy. Electrical down-tilting changes the phase element of the antenna's different radiating elements separately and simultaneously. This will allow RF engineers to change the gain of the pattern around the tower in full 360 degrees. The bottom portion of FIG. 3 depicts the coverage achieved using electrical tilt type.

Figure 3:
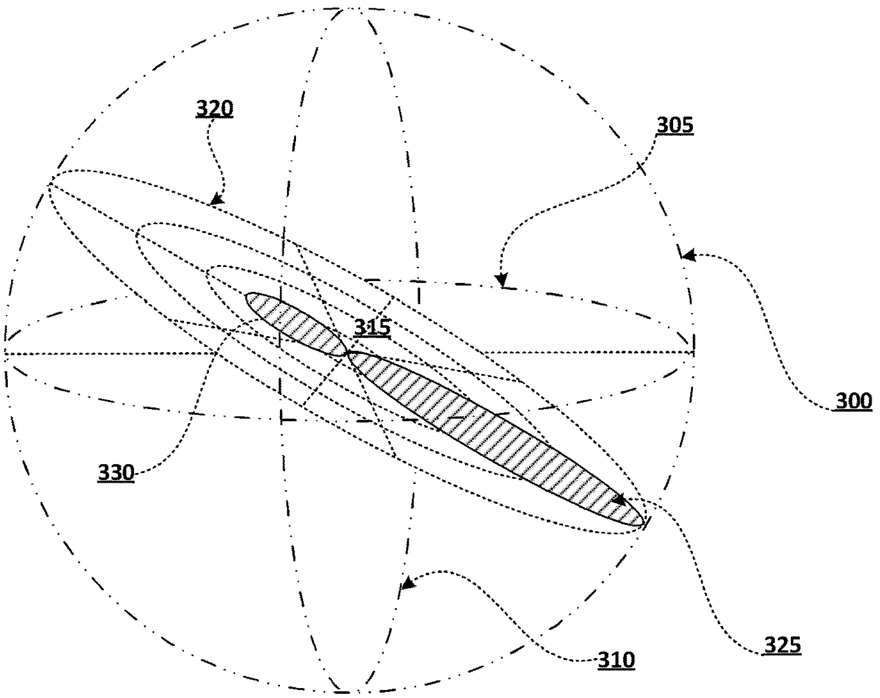
FIG. 3 is a diagram illustrating a comparison of 3D radiation patterns of a mechanical tilted antenna and an electronic tilted antenna.
Figure 3:
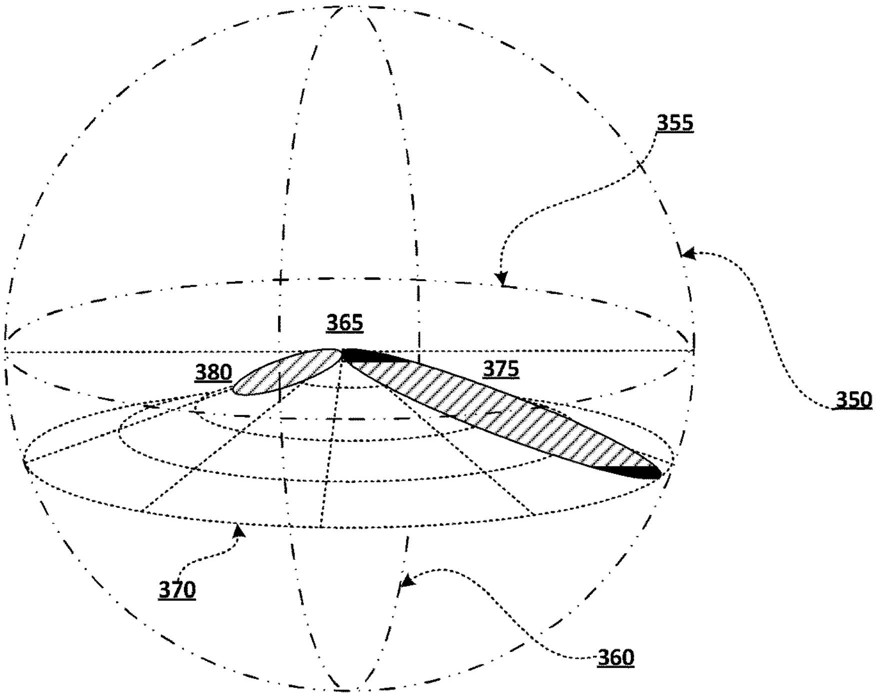

The difference between mechanical tilt and electrical tilt with respect to radiation pattern is shown in FIG. 3. Mechanical tilt results into pattern blooming while electrical tilt suppresses the pattern bloom. The electrical tilt achieves this result as it is able to tune individual radiating elements of antenna array. Mechanical tilt fails as it tunes the entire antenna as a fixed single unit. Further, as shown in the bottom portion of FIG. 3, when the front part (i.e. the main lobe 375) is tilted down to decrease the gain on horizon, the back side (i.e., the back lobe 380) is also tilted downside with the electrical tilt. In other words, the horizontal plane 355 is curved to the curved surface 370 with the electrical tilt, while the horizontal plane 305 is rotated to the tilted plane 320 with the mechanical tilt.

For 5G base station, it is the phased array which has been introduced into the mobile communication system. A phased array may comprise several sub-arrays that are used to support the beamforming.

Up to date, all the sub-arrays report a single state by its hardware design. Further, all the beamforming required phase and amplitude were realized outside the sub-array hardware. For example, with 64 Tx/Rx or T/R channels, the phase can be modified in the digital domain in a base band (BB) module or be modified in a transceiver module instead of a sub-array. For another example, with a 32 T/R channels, the phase may be modified in a Remote Electrical Tilt (RET) model instead of a sub-array.

Therefore, the "single state sub-array" imposes a limit for cost down. The main cost down action for a radio is to use 32 T/R to replace the 64 T/R and this action needs to increase the sub-array's scale. While with the "single state sub-array", the beam sweeping range reduces as the sub-array scale increases. Further, with the "single state sub-array", the side lobe suppression level reduces as the sub-array scale increases. Additionally, when phase is manipulated outside the sub-array, such as manipulated in the digital domain or in a RET module, the cost down decision will results in an increased sub-array scale. From above, this scale increase will result in the performance degradation when "single state sub-array" is used.

For example, a current radio platform, which is the 32 T/R Advanced Antenna System (AAS) over 128 Antenna Elements (AEs), may have a relatively large upper-side lobe when beam tilted to theta=99°. The term "theta" used herein may refer to an angle which is equal to the down tilting angle (e.g., δ° shown in FIG. 2) plus 90°. This is caused due to the antenna gain and upper-side-lobe-suppression (upper-SLS) ratio reports a conflict. In order to increase the antenna gain, the vertical size of the antenna array has to be enlarged. However, the upper side-lobe level increased simultaneously. The antenna gain is the platform's first priority requirement, which must be satisfied. Since there is no other option to improve the antenna gain besides enlarge the vertical size of the antenna array, solutions must be developed for reducing the upper-SLS for 32 T/R AAS over 128AE platform.

A RET module may be a solution to solve the issue. A RET module contains phase-shifters, motors, moving parts and control unit. It is the phase-shifter that enables the 32 T/R AAS over 128AE platform to reduce the upper side lobe. However, the cost, size and weight of a RET modules is great. In such a case, a cheaper and novel way for upper side lobe suppression method need to be developed.

Further, for 32 T/R antenna gain optimization when beam tilting, a mechanical RET module is the only solution up to date. However, this is an expensive and heavy solution. A low cost and electrical oriented RET is desired.

Further, for those scenarios in which a continuous beam sweeping can be replaced by beam switching, novelty designs are demanded besides RET module. The fundamental cause of these problems described above is that current sub-array has only one state.

In view of this, some embodiments of the present disclosure propose a solution of multi-state sub-arrays, namely the reconfigurable sub-arrays and its operating circuits on a radio board. Reconfigurable antenna is a type of antenna that its hardware contains at least 2 states that can be switched as system demands. A reconfigurable antenna can report quite a lot of reconfigurable parameters. For example, its operation bandwidth can be reconfigured, its polarization can be reconfigured, and/or its radiation pattern can be reconfigured.

When a reconfigurable sub-array is designed to be "pattern reconfigurable", it can change its radiation pattern without additional phase manipulating modules such as a RET, an equalizer or a BB module.

For the above described platform, the beam tuning range is from theta=91 to theta=99. Both the antenna gain and the upper SLS must be satisfied simultaneously within the beam tilting range. Although a single state sub-array cannot satisfy the gain and upper SLS requirements simultaneously within the beam tilting range of theta=91 to 99, one can manage to have a dual-state sub-array which can satisfy the gain and upper SLS requirements segmentally.

Firstly, for the problem that upper side lobe suppression conflicts with the antenna gain, a dual-state reconfigurable sub-array may be designed, with which the state-1 may cover a first range (e.g., the range of theta=91 to 95.9) and let the state-2 to cover a second range (e.g., the range of theta=96 to 99). Within each range, both the gain and upper SLS requirements can be satisfied simultaneously. Secondly, a state-switching schematic may be developed to enable the sub-array's state switching. Last but not least, a control schematic may be developed to enable the radio to perform the dual-state switching at low cost.

Further, for the problem that a continuous beam sweeping cannot be achieved, firstly, a multi-state reconfigurable sub-array and each state correspond to a beam direction may be designed. Secondly, a state-switching schematic may be developed to enable the sub-array's state switching. Last but not least, a control schematic may be developed to enable the radio to perform the multi-state switching at low cost.

Further, the embodiments describe below may have one or more following advantages:

(1) It is the next generation sub-array wanted status: a software reconfigurable aperture/a software defined aperture.

(2) It is compatible with current base station Radio Architecture.

(3) It is the low-cost solution for solving the low upper-SLS ratio issue which is suffered by 32T/R 128AE platform without using an expensive and bulky mechanical RET. Meanwhile, it is compatible with current base station Radio Architecture.

(3) Enable 1-bit/2-bit electrical RET equivalent control schematic.

(4) Enable electrical "RET equivalent solution" for beam-switch scenario.

In general, a base station with reconfigurable antenna may typically require two key modules: (1) multi-state switchable sub-array; and (2) the circuits that can reconfigure the sub-array's states. Next, detailed description of some embodiments of the present disclosure may be given with reference to FIG. 4 to FIG. 13.

Figure 4:
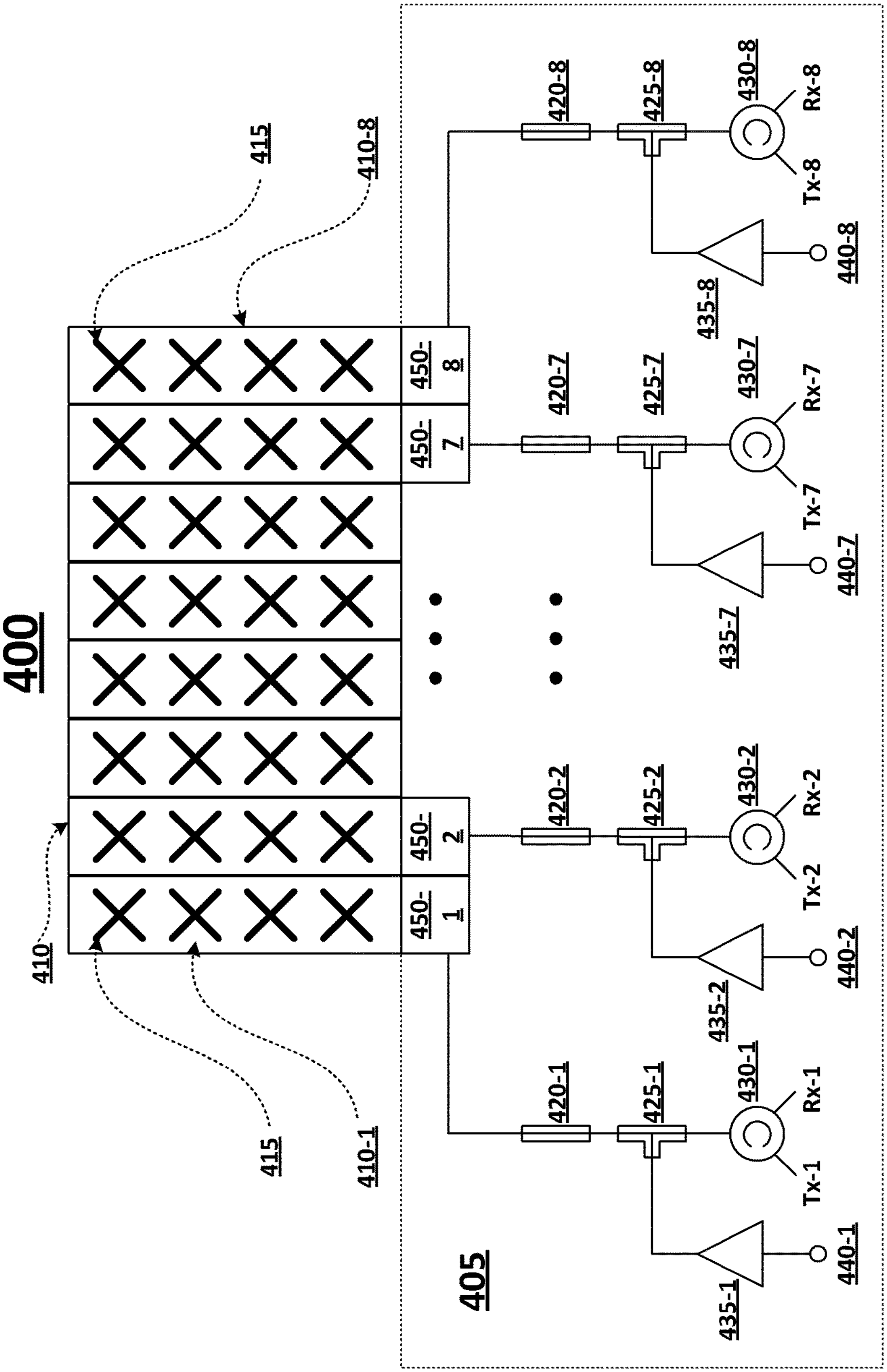
FIG. 4 is a schematic diagram illustrating an exemplary antenna system according to an embodiment of the present disclosure.

FIG. 4 is a schematic diagram illustrating an exemplary antenna system 400 according to an embodiment of the present disclosure. As shown in FIG. 4, the antenna system 400 may comprise an antenna array 410 comprising one or more sub-arrays 410-1 to 410-8 of antenna elements (AEs) 415. In some embodiments, at least one of the sub-arrays 410-1 to 410-8 may be operable in more than one state. For example, the sub-array 410-1 may be operated in two states, one for theta=91 to 95.9 and the other for theta=96 to 99. For another example, all the sub-arrays 410-1 to 410-8 may be operated in more than one state. In some embodiments, the more than one state may comprise two states, three states, or even more states as required.

Further, although FIG. 4 shows a total of 8 sub-arrays 410-1 to 410-8, the present disclosure is not limited thereto. In some other embodiments, the antenna array 410 may comprise any appropriate number of sub-arrays. Further, although FIG. 4 shows the sub-arrays 410-1 to 410-8 with a 4×1 configuration, the present disclosure is not limited thereto. In some other embodiments, a sub-array may have a 2×1, 3×1, 4×1, 6×1, or any other appropriate configuration.

Further, the antenna system 400 may further comprise a state switching circuit 405 electrically coupled to the at least one of the sub-arrays 410-1 to 410-8 and configured to drive the at least one of the sub-array 410-1 to 410-8 to operate in a first state in which an upper side lobe of the antenna array may be suppressed for a first beam tilting range (e.g., 91 to 95.9) or in a second state in which an upper side lobe of the antenna array may be suppressed for a second beam tilting range (e.g., 96 to 99) which may be different from the first beam tilting range.

As also shown in FIG. 4, for the sub-arrays 410-1, the state switching circuit 405 may comprise a bias-T 425-1. The bias-T 425-1 may be a three-port network used for setting the DC bias point of some electronic components without disturbing other components. The bias-T 425-1 may have a combined port connected to a device (in our case, a phase tuning circuit 450-1, for example), which sees both the bias and RF. It is called a "T" because the 3 ports are often arranged in the shape of a "T". As shown in FIG. 4, the bias-T 425-1 may have a first terminal electrically coupled to a driver integrated chip (IC) 435-1 to receive a control signal from the driver IC 435-1, a second terminal electrically coupled to a specific Tx/Rx chain or channel (i.e., Tx-1/Rx-1) 430-1 of a transceiver to receive/transmit a radio frequency (RF) signal from/to the transceiver, and a third terminal (e.g., the combined port) electrically coupled to a first terminal of a phase tuning circuit 450-1 to communicate the control signal and the RF signal with the phase tuning circuit 450-1. Further, the phase tuning circuit 450 may have its first terminal electrically coupled to the third terminal of the bias-T 425-1 and one or more second terminals electrically coupled to each of the antenna elements 415 of the at least one sub-array 410-1, respectively. Although only one connection between the sub-array 410-1 and the phase tuning circuit 450-1 is shown in FIG. 4, the present disclosure is not limited thereto.

Similarly, for the sub-arrays 410-2 to 410-8, the state switching circuit 405 may comprise bias-Ts 425-2 to 425-8 and phase tuning circuit 450-2 to 450-8, respectively. With the bias-Ts 425-1 to 425-8, the phase tuning circuits 450-1 to 450-8 may tune the phases of the RF signals based on the received control signals, respectively, while the control signals and the RF signals may be conducted via same signal paths. That is, in some embodiments, at least one of the phase tuning circuits 450-1 to 450-8 may be configured to tune the phase of the RF signal, which passes through the at least one phase tuning circuit, based on the control signal. In some embodiments, all of the phase tuning circuits 450-1 to 450-8 may be configured to tune the phase of the RF signal, which passes through the phase tuning circuit, based on the control signal.

Figure 9:
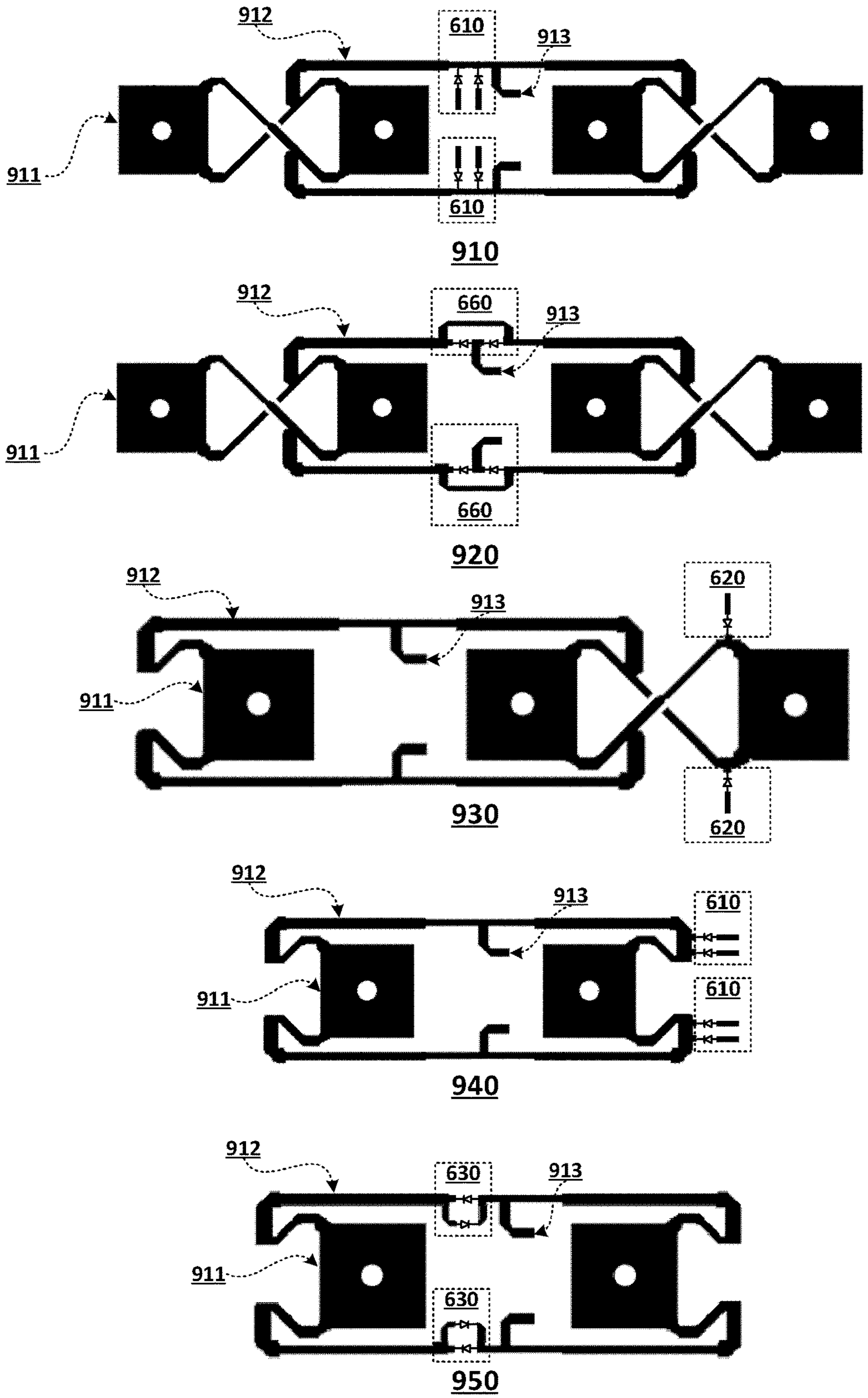
FIG. 9 is a diagram illustrating exemplary antenna designs according to embodiments of the present disclosure.

Although it is shown in FIG. 4 that the phase tuning circuits 450-1 to 450-8 logically belong to the state switching circuit 405, the phase tuning circuit 450-1 to 450-8 may physically belong to the sub-arrays 410-1 to 410-8, respectively, for example, as shown in FIG. 9.

As shown in FIG. 4, for the sub-array 410-1, the third terminal of the bias-T 425-1 may be electrically coupled to the first terminal of the phase tuning circuit 450-1 through a board-to-board connector 420-1. Similarly, for the sub-arrays 410-2 to 410-8, the third terminals of the bias-Ts 425-2 to 425-8 may be electrically coupled to the first terminals of the phase tuning circuits 450-2 to 450-8 through board-to-board connectors 420-2 to 420-8, respectively.

In some embodiments, the control signal provided from the driver IC 435-1 to the bias-T 425-1 may be triggered by or originated from a processor or a controller (e.g. a host processor of an RF communication device on which the antenna system 400 is mounted), which is not shown in FIG. 4, via an I/O 440-1. Similarly, the control signals provided from the driver ICs 435-2 to 435-8 to the bias-Ts 425-2 to 425-8 may be triggered by or originated from the processor or the controller via I/Os 440-2 to 440-8, respectively.

In this way, the control circuits on the radio board, which can reconfigure the sub-arrays' states, may be composed of digital I/Os (e.g., 440), the driver IC (e.g., 435), the bias-Ts (e.g., 425) and/or the board-to-board connectors (e.g., 420). Such an exemplary architecture may allow the minimum change of the base station's mechanical structure. Further, in some embodiments, additional I/O cables may be required between the antenna array and the radio board.

Next, details of the phase tuning circuits 450-1 to 450-8 may be described with reference to FIG. 5.

Figure 5:
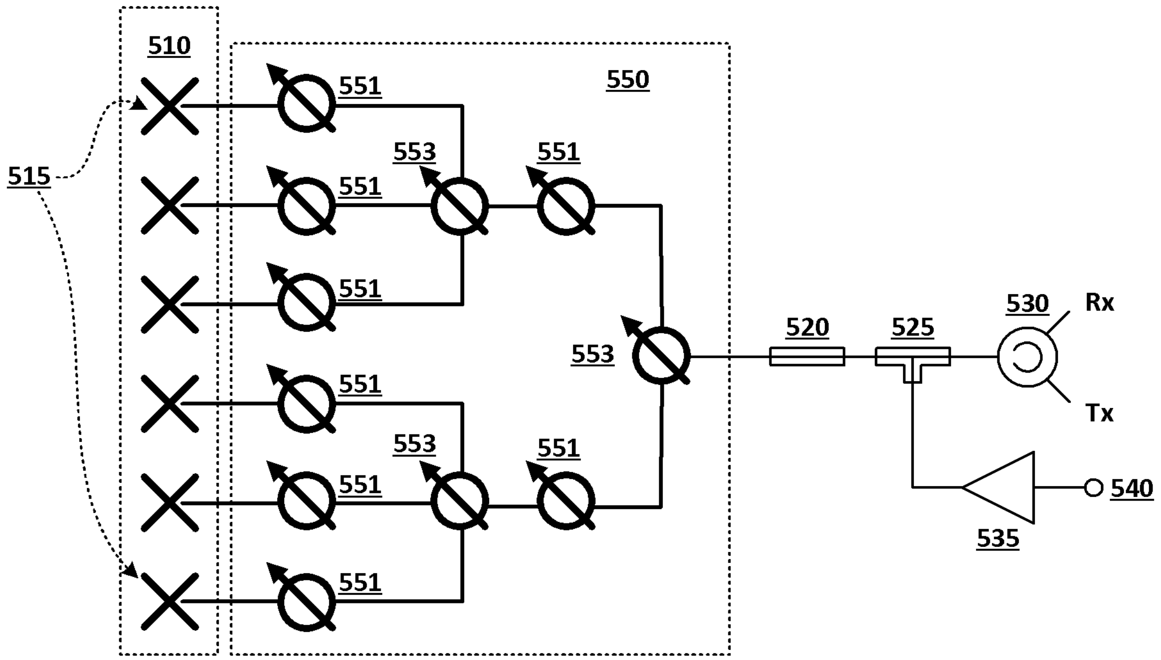
FIG. 5 is a schematic diagram illustrating exemplary antenna systems with different configurations according to embodiments of the present disclosure.
Figure 5:
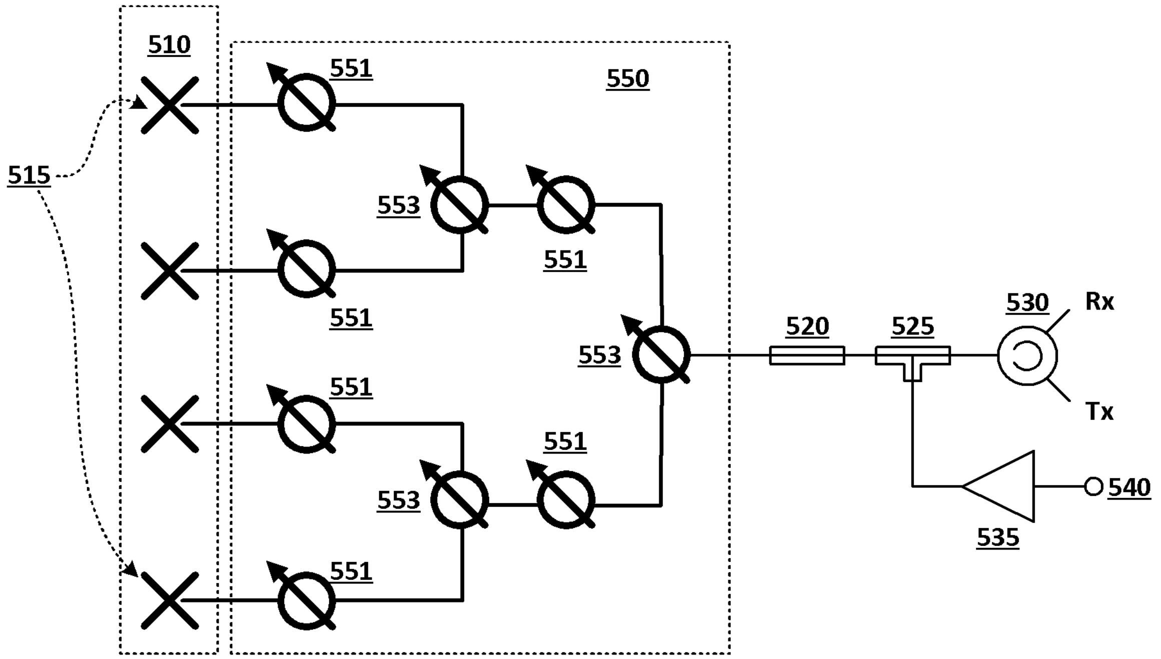

FIG. 5 is a schematic diagram illustrating exemplary antenna systems with different configurations according to embodiments of the present disclosure. A 6×1 configuration is shown in (a) of FIG. 5 while a 4×1 configuration is shown in (b) of FIG. 5. However, the present disclosure is not limited thereto. In some other embodiments, the inventive concept of some embodiments of the present disclosure may also be applicable to different configurations.

As shown in (a) of FIG. 5, an antenna system may comprise a sub-array 510 of AEs 515. The sub-array 510 may be electrically coupled to a phase tuning circuit 550 which may be electrically coupled to a board-to-board connector 520, a bias-T 525, a Tx/Rx chain or channel 530, and/or a driver IC 535 directly or indirectly. In some embodiments, the board-to-board connector 520, the bias-T 525, the Tx/Rx chain or channel 530, and the driver IC 535 may correspond to the board-to-board connector 420-1, the bias-T 425-1, the Tx/Rx chain or channel 430-1, and the driver IC 435-1, respectively, and therefore the descriptions thereof may be omitted for simplicity.

Referring to (a) of FIG. 5, the phase tuning circuit 550 may comprise one or more first phase tuning modules 551, one or more second phase tuning modules 553, or a combination thereof. In some embodiments, each of the first phase tuning modules 551 may have two terminals (e.g. 1-in-1-out from the perspective of the control signal) and configured to communicate the RF signal with its phase tuned based on the control signal received from one of the two terminals. In some embodiments, each of the second phase tuning modules 553 may have three terminals (e.g. 1-in-2-out from the perspective of the control signal) and configured to communicate the RF signal with its phase tuned based on the control signal received from one of the three terminals.

For example, when an RF signal is to be transmitted via the antenna system shown in FIG. 5, the RF signal may be propagated from the Tx/Rx chain or channel 530, to the bias-T 525, then to the connector 520, then to the phase tuning circuit 550, and finally to each of the AEs 515, with its phase tuned by the first and/or second tuning modules 551/553 based on the control signal received from the driver I/C 535. To be more specific, when the control signal indicates a first state, then the first and/or second tuning modules 551/553 may introduce a first phase delay to the RF signal, and when the control signal indicates a second state, then the first and/or second tuning modules 551/553 may introduce a second phase delay to the RF signal, such that the tuned RF signal may be radiated to form different beams with different radiation patterns.

Figure 7A:
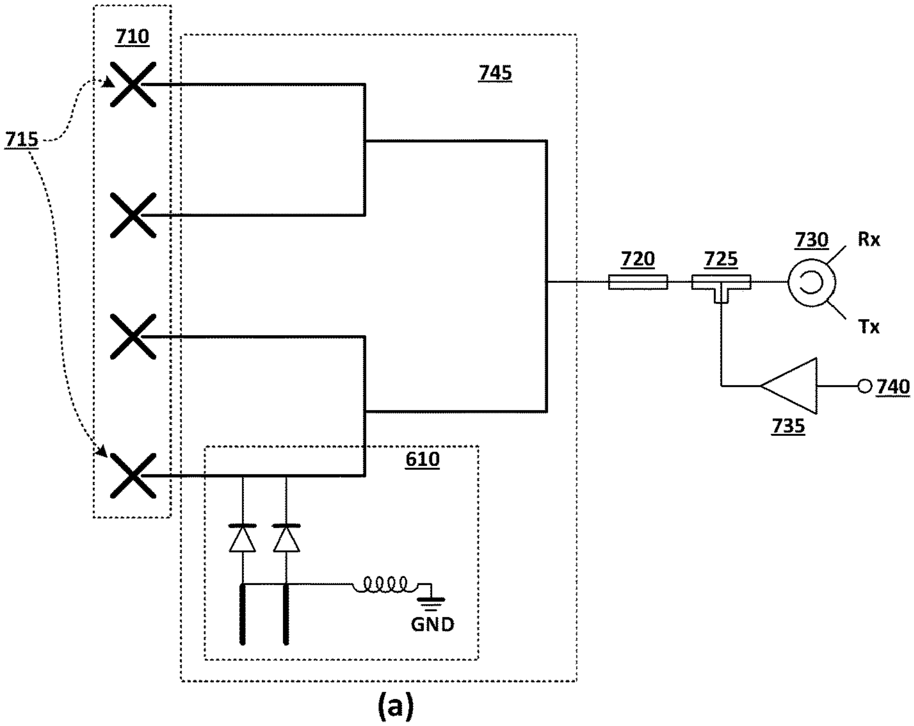
FIG. 7A to FIG. 8B are schematic diagrams illustrating exemplary antenna systems with different configurations according to embodiments of the present disclosure.
Figure 7B:
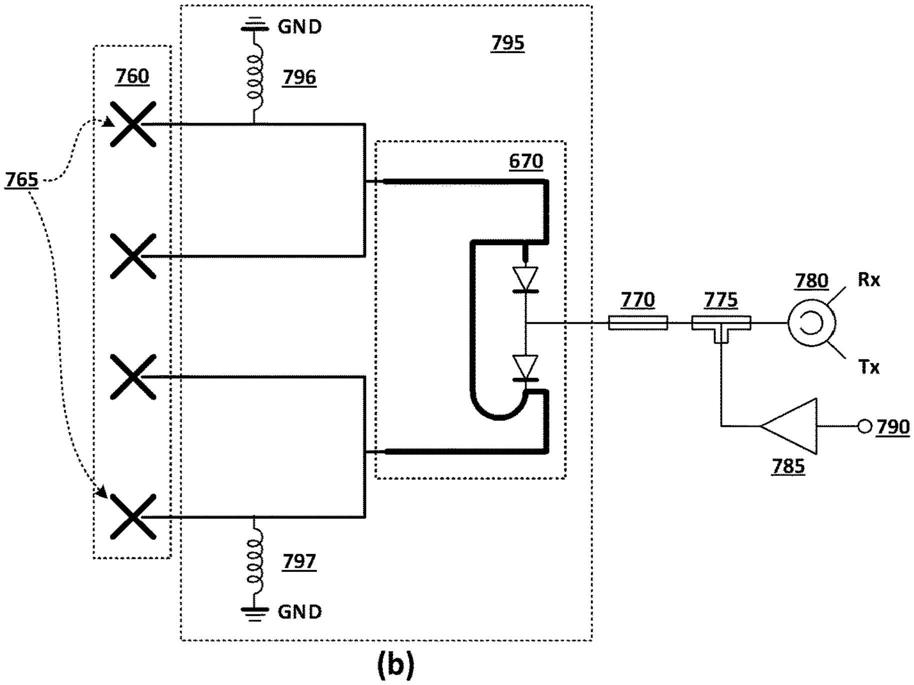

Further, although there is a first or second phase tuning module on each possible leg of the path from the Tx/Rx chain or channel 530 to each of the AEs 515, the present disclosure is not limited thereto. In some other embodiments, some of the first and/or second modules may be omitted to achieve a desired phase tuning effect. For example, as shown in FIG. 7A, there is only a first phase tuning module 610 in the phase tuning circuit 745. For another example, as shown in FIG. 7B, there is only a second phase tuning module 670 in the phase tuning circuit 795.

A 4×1 configuration is shown in (b) of FIG. 5. The only difference between (a) and (b) of FIG. 5 lies in the configuration of the sub-array 510 and the corresponding phase tuning circuit 550, and therefore the description of other elements is omitted for simplicity. Similar to that shown in (a) of FIG. 5, the phase tuning circuit 550 in (b) may also comprise one or more first phase tuning modules 551, one or more second phase tuning modules 553, or a combination thereof. In some embodiments, each of the first phase tuning modules 551 may have two terminals (e.g. 1-in-1-out from the perspective of the control signal) and configured to communicate the RF signal with its phase tuned based on the control signal received from one of the two terminals. In some embodiments, each of the second phase tuning modules 553 may have three terminals (e.g. 1-in-2-out from the perspective of the control signal) and configured to communicate the RF signal with its phase tuned based on the control signal received from one of the three terminals. Similarly, some of the first and/or second modules may also be omitted to achieve a desired phase tuning effect.

Next, some specific examples of the first/second phase tuning modules 551/553 may be described with reference to FIG. 6A and FIG. 6B, respectively.

Figure 6A:
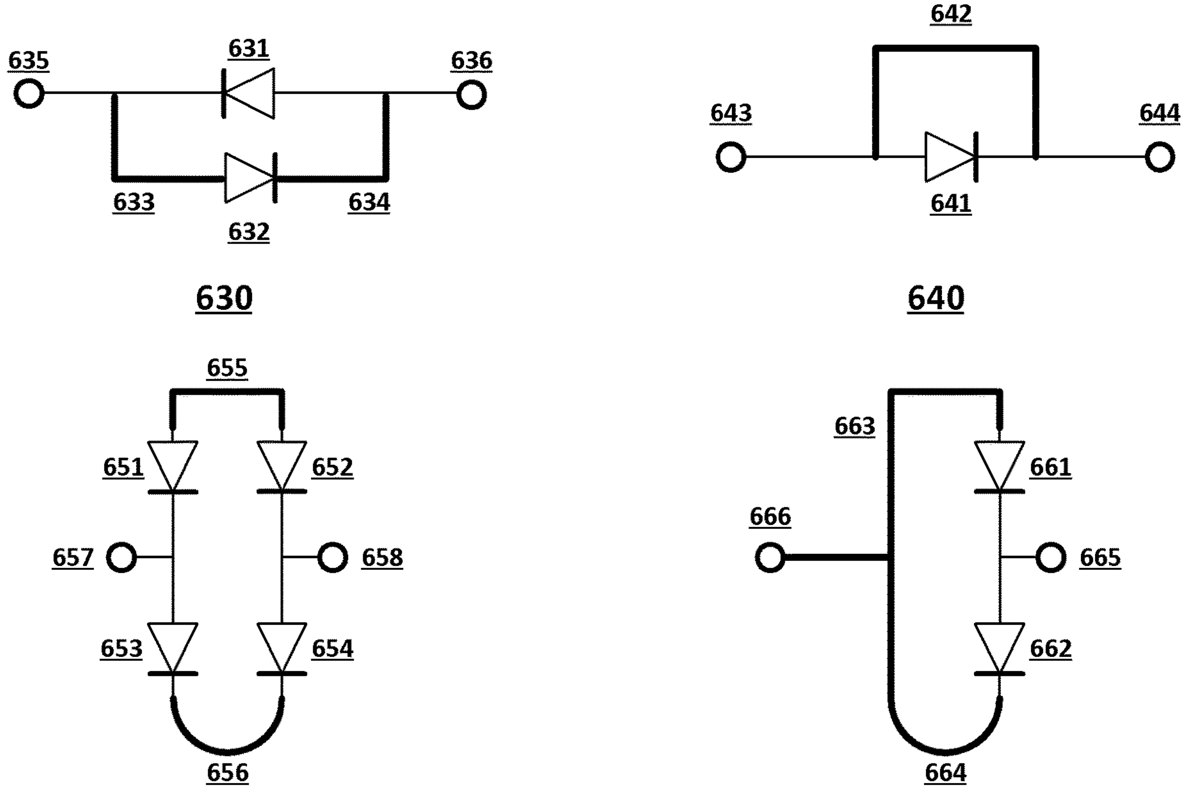
FIG. 6A and FIG. 6B are schematic diagrams illustrating exemplary phase tuning modules according to embodiments of the present disclosure.
Figure 6B:
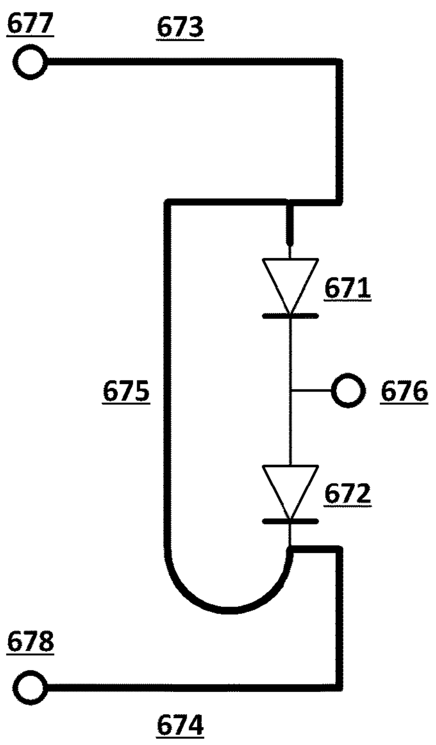
Figure 6B:
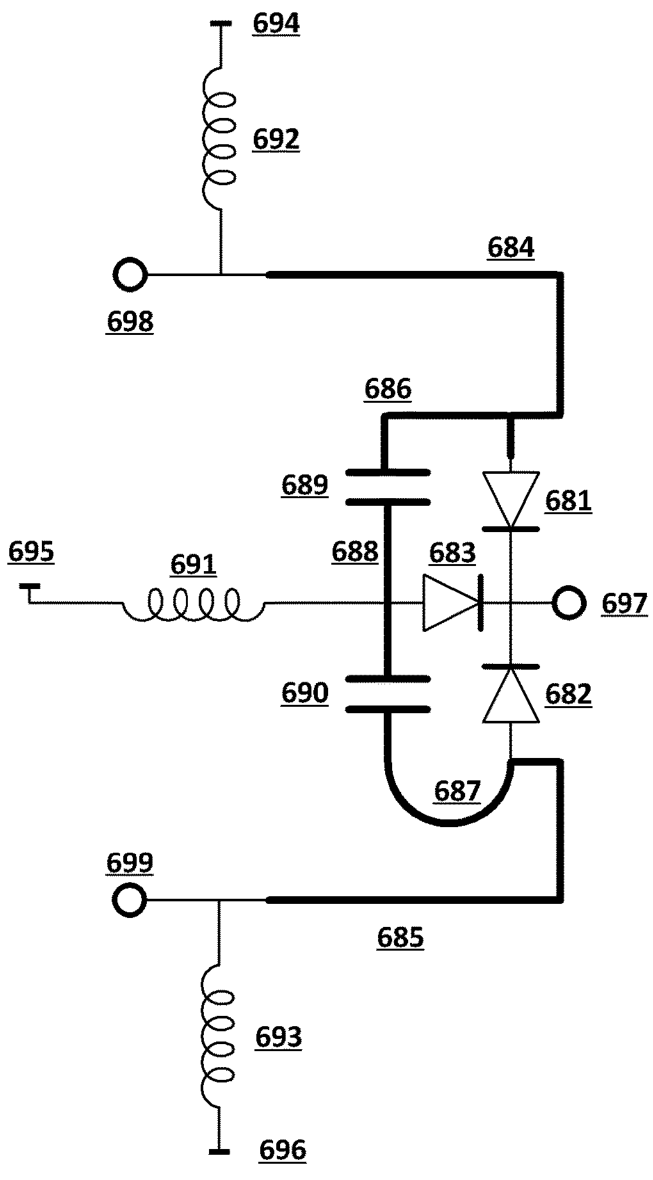

FIG. 6A is a schematic diagram illustrating exemplary first phase tuning modules according to embodiments of the present disclosure, while FIG. 6B is a schematic diagram illustrating exemplary second phase tuning modules according to embodiments of the present disclosure.

As shown in FIG. 6A, multiple specific designs 610, 620, 630, 640, 650, and 660 of the first phase tuning modules 551 are illustrated.

In some embodiments, the first phase tuning module 610 may comprise a first PIN diode 611 having a first terminal electrically coupled to a first terminal of an inductor 615 and a second terminal serving as the terminals 616/617 of the first phase tuning module 610. Further, the first phase tuning module 610 may further comprise a first stub 613 having a first terminal electrically coupled to the first terminal of the first PIN diode 611 and a second terminal floated. Further, the first phase tuning module 610 may further comprise a second PIN diode 612 having a first terminal electrically coupled to the first terminal of the inductor 615 and a second terminal electrically coupled to the second terminal of the first PIN diode 611. Further, the first phase tuning module 610 may further comprise a second stub 614 having a first terminal electrically coupled to the first terminal of the second PIN diode 612 and a second terminal floated. Further, the first phase tuning module 610 may further comprise the inductor 615 having the first terminal electrically coupled to the first terminal of the first PIN diode 611 and the first terminal of the second PIN diode 612 and a second terminal electrically coupled to the ground GND.

In some embodiments, the first phase tuning module 620 may comprise a first PIN diode 621 having a first terminal electrically coupled to a first terminal of a first stub 622 and a second terminal serving as the terminals 623/624 of the first phase tuning module 620. Further, the first phase tuning module 620 may further comprise the first stub 622 having the first terminal electrically coupled to the first terminal of the first PIN diode 621 and a second terminal floated.

In some embodiments, the first phase tuning module 630 may comprise a first PIN diode 631 having a first terminal serving as one terminal 636 of the first phase tuning module 630 and a second terminal serving as the other terminal 635 of the first phase tuning module 630. Further, the first phase tuning module 630 may further comprise a first signal path 634 having a first terminal electrically coupled to the first terminal of the first PIN diode 631 and a second terminal electrically coupled to a second terminal of a second PIN diode 632. Further, the first phase tuning module 630 may further comprise a second signal path 633 having a first terminal electrically coupled to the second terminal of the first PIN diode 631 and a second terminal electrically coupled to a first terminal of the second PIN diode 632. Further, the first phase tuning module 630 may further comprise the second PIN diode 632 having the first terminal electrically coupled to the second terminal of the second signal path 633 and the second terminal electrically coupled to the second terminal of the first signal path 634.

In some embodiments, the first phase tuning module 640 may comprise a first PIN diode 641 having a first terminal serving as one terminal 643 of the first phase tuning module 640 and a second terminal serving as the other terminal 644 of the first phase tuning module 640. Further, the first phase tuning module 640 may further comprise a first bridging conductor trace 642 having a first terminal electrically coupled to the first terminal of the first PIN diode 641 and a second terminal electrically coupled to the second terminal of the first PIN diode 641.

In some embodiments, the first phase tuning module 650 may comprise a first PIN diode 651 having a first terminal electrically coupled to a first terminal of a first signal path 655 and a second terminal serving as one terminal 657 of the first phase tuning module 650. Further, the first phase tuning module 650 may further comprise the first signal path 655 having the first terminal electrically coupled to the first terminal of the first PIN diode 651 and a second terminal electrically coupled to a first terminal of a second PIN diode 652. Further, the first phase tuning module 650 may further comprise the second PIN diode 652 having the first terminal electrically coupled to the second terminal of the first signal path 655 and a second terminal serving as the other terminal 658 of the first phase tuning module 650. Further, the first phase tuning module 650 may further comprise a third PIN diode 653 having a first terminal electrically coupled to the second terminal of the first PIN diode 651 and a second terminal electrically coupled to a first terminal of a second signal path 656. Further, the first phase tuning module 650 may further comprise the second signal path 656 having the first terminal electrically coupled to the second terminal of the third PIN diode 653 and a second terminal electrically coupled to a second terminal of a fourth PIN diode 654. Further, the first phase tuning module 650 may further comprise the fourth PIN diode 654 having a first terminal electrically coupled to the second terminal of the second PIN diode 652 and the second terminal electrically coupled to the second terminal of the second signal path 656.

In some embodiments, the first phase tuning module 660 may comprise a first PIN diode 661 having a first terminal electrically coupled to a first terminal of a first signal path 663 and a second terminal serving as one terminal 665 of the first phase tuning module 660. Further, the first phase tuning module 660 may further comprise the first signal path 663 having the first terminal electrically coupled to the first terminal of the first PIN diode 661 and a second terminal serving as the other terminal 666 of the first phase tuning module 660. Further, the first phase tuning module 660 may further comprise a second PIN diode 662 having a first terminal electrically coupled to the second terminal of the first PIN diode 661 and a second terminal electrically coupled to a first terminal of a second signal path 664. Further, the first phase tuning module 660 may further comprise the second signal path 664 having the first terminal electrically coupled to the second terminal of the second PIN diode 662 and a second terminal electrically coupled to the second terminal of the first signal path 663.

In some embodiments, the first phase tuning modules 610 to 660 may introduce a phase delay to an RF signal which passes through the first phase tuning modules 610 to 660, respectively. For example, the PIN diodes in these modules may be turned on or off based on the control signal, and different signal paths for the RF signal may be formed accordingly and different phase delays may be introduced.

As shown in FIG. 6B, multiple specific designs 670 and 680 of the second phase tuning modules 553 are illustrated.

In some embodiments, the second phase tuning module 670 may comprise a first PIN diode 671 having a first terminal electrically coupled to a first terminal of a first signal path 673 and a second terminal serving as a first terminal 676 of the second phase tuning module 670. Further, the second phase tuning module 670 may further comprise the first signal path 673 having a first terminal electrically coupled to the first terminal of the first PIN diode 671 and a second terminal serving as a second terminal 677 of the second phase tuning module 670. Further, the second phase tuning module 670 may further comprise a second PIN diode 672 having a first terminal electrically coupled to the second terminal of the first PIN diode 671 and a second terminal electrically coupled to a first terminal of a second signal path 674. Further, the second phase tuning module 670 may further comprise the second signal path 674 having the first terminal electrically coupled to the second terminal of the second PIN diode 672 and a second terminal serving as a third terminal 678 of the second phase tuning module 670. Further, the second phase tuning module 670 may further comprise a third signal path 675 having a first terminal electrically coupled to the first terminal of the second signal path 674 and a second terminal electrically coupled to the first terminal of the first signal path 673.

In some embodiments, the second phase tuning module 680 may comprise a first PIN diode 681 having a first terminal electrically coupled to a first terminal of a first signal path 684 and a second terminal serving as a first terminal 697 of the second phase tuning module 680. Further, the second phase tuning module 680 may further comprise the first signal path 684 having the first terminal electrically coupled to the first terminal of the first PIN diode 681 and a second terminal serving as a second terminal 698 of the second phase tuning module 680. Further, the second phase tuning module 680 may further comprise a second PIN diode 682 having a first terminal electrically coupled to a first terminal of a second signal path 685 and a second terminal electrically coupled to the second terminal of the first PIN diode 681. Further, the second phase tuning module 680 may further comprise the second signal path 685 having the first terminal electrically coupled to the first terminal of the second PIN diode 682 and a second terminal serving as a third terminal 699 of the second phase tuning module 680. Further, the second phase tuning module 680 may further comprise a third signal path 686 having a first terminal electrically coupled to the first terminal of the first PIN diode 681 and a second terminal electrically coupled to a first terminal of a first capacitor 689. Further, the second phase tuning module 680 may further comprise the first capacitor 689 having the first terminal electrically coupled to the second terminal of the third signal path 686 and a second terminal electrically coupled to a first terminal of a fifth signal path 688. Further, the second phase tuning module 680 may further comprise a fourth signal path 687 having a first terminal electrically coupled to the first terminal of the second PIN diode 682 and a second terminal electrically coupled to a second terminal of a second capacitor 690. Further, the second phase tuning module 680 may further comprise the second capacitor 690 having a first terminal electrically coupled to a second terminal of the fifth signal path 688 and the second terminal electrically coupled to the second terminal of the fourth signal path 687. Further, the second phase tuning module 680 may further comprise the fifth signal path 688 having the first terminal electrically coupled to the second terminal of the first capacitor 689 and the second terminal electrically coupled to the first terminal of the second capacitor 690. Further, the second phase tuning module 680 may further comprise a first inductor 692 having a first terminal electrically coupled to a first voltage signal terminal 694 and a second terminal electrically coupled to the second terminal of the first signal path 684. Further, the second phase tuning module 680 may further comprise a second inductor 693 having a first terminal electrically coupled to a third voltage signal terminal 696 and a second terminal electrically coupled to the second terminal of the second signal path 685. Further, the second phase tuning module 680 may further comprise a third PIN diode 683 having a first terminal electrically coupled to a second terminal of a third inductor 691 and a second terminal electrically coupled to the second terminal of the first PIN diode 681. Further, the second phase tuning module 680 may further comprise the third inductor 691 having a first terminal electrically coupled to a second voltage signal terminal 695 and the second terminal electrically coupled to the first terminal of the third PIN diode 683.

As can be seen from FIG. 6B, the second phase tuning modules 670 and 680 may introduce a phase delay to an RF signal which passes through the second phase tuning modules 670 and 680, respectively. For example, the PIN diodes in these modules may be turned on or off based on the control signal, and different signal paths for the RF signal may be formed accordingly and different phase delays are introduced.

As shown in FIG. 6A and FIG. 6B, the first terminal of any of the PIN diodes may be an anode while the second terminal of any of the PIN diodes may be a cathode. However, the present disclosure is not limited thereto. In some other embodiments, the first terminal of any of the PIN diodes may be a cathode while the second terminal of any of the PIN diode may be an anode. In yet some other embodiments, the first terminals of some PIN diodes may be anodes and their corresponding second terminals may be cathodes, while the first terminal of rest of the PIN diodes may be cathodes and their corresponding second terminals may be anodes. With different control signals, such designs may function in a similar manner. In general, the design of the phase tuning circuit and/or the phase tuning modules may depend on factors comprising but not limited to the control signal, an expected phase delay for each signal path in different states, etc.

Please note that any "stub", "trace", and/or "signal path" herein may be conductors for propagating electrical signals, such as the RF signals, the control signal, or any other electrical signals.

Next, some specific examples of the antenna system which may report two different states under the control of the control signal may be described with reference to FIG. 7A to FIG. 8B.

FIG. 7A is a schematic diagram illustrating an exemplary antenna system according to an embodiment of the present disclosure. As shown in FIG. 7A, the antenna system may comprise a sub-array 710 of AEs 715. Further, there may be other sub-arrays in the antenna system, and they are omitted for simplicity. The sub-array 710 may be electrically coupled to a phase tuning circuit 745 which may be electrically coupled to a board-to-board connector 720, a bias-T 725, a Tx/Rx chain or channel 730, and/or a driver IC 735 directly or indirectly. In some embodiments, the board-to-board connector 720, the bias-T 725, the Tx/Rx chain or channel 730, and the driver IC 735 may correspond to the board-to-board connector 420-1, the bias-T 425-1, the Tx/Rx chain or channel 430-1, and the driver IC 435-1, respectively, and therefore the descriptions thereof may be omitted for simplicity.

Referring to FIG. 7A, the phase tuning circuit 745 may comprise a first phase tuning module 610 shown in FIG. 6A. When the control signal from the driver IC 735 indicates a first state and turns the PIN diodes OFF in the first phase tuning module 610, the stubs and the inductor of the first phase tuning module 610 do not introduce any additional phase delay into the RF signal passing through the signal path. However, when the control signal from the driver IC 735 indicates a second state and turns the PIN diodes ON, the stubs and the inductor of the first phase tuning module 610 may introduce a phase delay, which is carefully designed, into the RF signal passing through the signal path, such that a different beam tiling range may be achieved when compared with that in the first state.

FIG. 7B is a schematic diagram illustrating another exemplary antenna system according to another embodiment of the present disclosure. As shown in FIG. 7B, the antenna system may comprise a sub-array 760 of AEs 765. Further, there may be other sub-arrays in the antenna system, and they are omitted for simplicity. The sub-array 760 may be electrically coupled to a phase tuning circuit 795 which may be electrically coupled to a board-to-board connector 770, a bias-T 775, a Tx/Rx chain or channel 780, and/or a driver IC 785 directly or indirectly. In some embodiments, the board-to-board connector 770, the bias-T 775, the Tx/Rx chain or channel 780, and the driver IC 785 may correspond to the board-to-board connector 420-1, the bias-T 425-1, the Tx/Rx chain or channel 430-1, and the driver IC 435-1, respectively, and therefore the descriptions thereof may be omitted for simplicity.

Referring to FIG. 7B, the phase tuning circuit 795 may comprise a second phase tuning module 670 shown in FIG. 6B. When the control signal from the driver IC 785 indicates a first state and turns one PIN diode ON (e.g., the upper PIN diode ON) and the other PIN diode OFF (e.g., the lower PIN diode OFF) in the second phase tuning module 670, the RF signal travels to the two upper AEs 760 via a shorter signal path while the RF signal travels to the two lower AEs 760 via a longer signal path. When the control signal from the driver IC 785 indicates a second state and turns the one PIN diode OFF (e.g., the upper PIN diode OFF) and the other PIN diode ON (e.g., the lower PIN diode ON) in the second phase tuning module 670, the RF signal travels to the two upper AEs 760 via a longer signal path while the RF signal travels to the two lower AEs 760 via a shorter signal path. In such a case, in different states, different phase delays are introduced to the RF signals to be radiated at different AEs, such that a different beam tiling range may be achieved in the second state when compared with that in the first state.

Figure 8A:
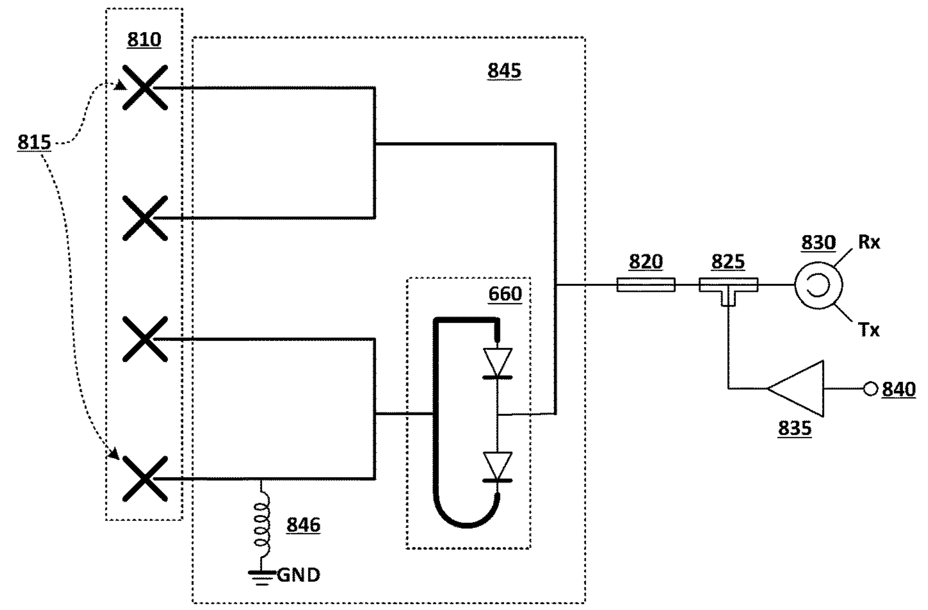

FIG. 8A is a schematic diagram illustrating yet another exemplary antenna system according to yet another embodiment of the present disclosure. As shown in FIG. 8A, the antenna system may comprise a sub-array 810 of AEs 815. Further, there may be other sub-arrays in the antenna system, and they are omitted for simplicity. The sub-array 810 may be electrically coupled to a phase tuning circuit 845 which may be electrically coupled to a board-to-board connector 820, a bias-T 825, a Tx/Rx chain or channel 830, and/or a driver IC 835 directly or indirectly. In some embodiments, the board-to-board connector 820, the bias-T 825, the Tx/Rx chain or channel 830, and the driver IC 835 may correspond to the board-to-board connector 420-1, the bias-T 425-1, the Tx/Rx chain or channel 430-1, and the driver IC 435-1, respectively, and therefore the descriptions thereof may be omitted for simplicity.

Referring to FIG. 8A, the phase tuning circuit 845 may comprise a first phase tuning module 660 shown in FIG. 6A. When the control signal from the driver IC 835 indicates a first state and turns one PIN diode ON (e.g., the upper PIN diode ON) and the other PIN diode OFF (e.g., the lower PIN diode OFF) in the first phase tuning module 660, the RF signal travels to the two lower AEs 815 via the upper signal path of the first phase tuning module 660. When the control signal from the driver IC 835 indicates a second state and turns the one PIN diode OFF (e.g., the upper PIN diode OFF) and the other PIN diode ON (e.g., the lower PIN diode ON) in the first phase tuning module 660, the RF signal travels to the two lower AEs 815 via the lower signal path of the first phase tuning module 660 which may have a different length than that of the upper signal path of the first phase tuning module 660. Therefore, the upper signal path and the lower signal path of the first phase tuning module 660 may introduce a first phase delay and a second phase delay (which is different from the first phase delay) to the RF signal travelling to the two upper AEs 815 in different states, respectively, such that a different beam tiling range may be achieved in the second state when compared with that in the first state.

Figure 8B:
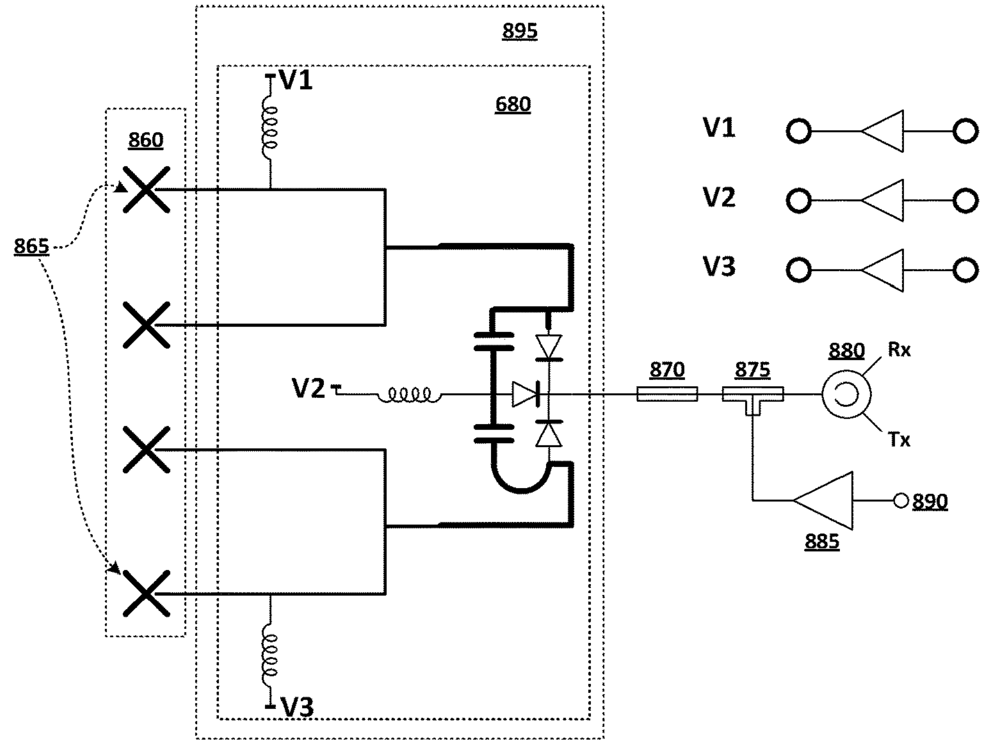

FIG. 8B is a schematic diagram illustrating a further exemplary antenna system according to a further embodiment of the present disclosure. As shown in FIG. 8B, the antenna system may comprise a sub-array 860 of AEs 865. Further, there may be other sub-arrays in the antenna system, and they are omitted for simplicity. The sub-array 860 may be electrically coupled to a phase tuning circuit 895 which may be electrically coupled to a board-to-board connector 870, a bias-T 875, a Tx/Rx chain or channel 880, and/or a driver IC 885 directly or indirectly. In some embodiments, the board-to-board connector 870, the bias-T 875, the Tx/Rx chain or channel 880, and the driver IC 885 may correspond to the board-to-board connector 420-1, the bias-T 425-1, the Tx/Rx chain or channel 430-1, and the driver IC 435-1, respectively, and therefore the descriptions thereof may be omitted for simplicity.

Referring to FIG. 8B, the phase tuning circuit 895 may comprise a second phase tuning module 680 shown in FIG. 6B. When the control signal from the driver IC 885 indicates a first state, a second state, and a third state, respectively, the RF signal may travel to the respective AEs 865 via different signal paths with different length, and therefore have its phase tuned differently, such that three different beam tiling ranges may be achieved in the three different states, respectively.

FIG. 9 is a diagram illustrating exemplary antenna designs according to embodiments of the present disclosure. As shown in FIG. 9, each of the sub-arrays 910 to 950 may comprise AEs 911, T-combiners 912 which combines adjacent AEs 911 and conducts signals therebetween, and feed points 913 for feed RF signals and/or the control signals.

In some embodiments, the sub-array 910 may comprise four antenna elements 911 in a 4×1 form and any two adjacent antenna elements 911 may be electrically coupled to each other (e.g., via the T-combiners 912). A first phase tuning module 610 (e.g., the upper first phase tuning module 610) may be electrically coupled between a first terminal of one of the middle two antenna elements 911 and a first terminal of the other of the middle two antenna elements 911, and another first phase tuning module 610 (e.g., the lower first phase tuning module 610) may be electrically coupled between a second terminal of the one of the middle two antenna elements 911 and a second terminal of the other of the middle two antenna elements 911. For example, the two first phase tuning module 610 may be electrically coupled to the T-combiners 912 which are electrically coupled between the middle two AEs 911 as shown by 910 in FIG. 9.

In some embodiments, the sub-array 920 may comprise four antenna elements 911 in a 4×1 form and any two adjacent antenna elements 911 may be electrically coupled to each other (e.g., via the T-combiners 912). A first phase tuning module 660 (e.g., the upper first phase tuning module 660) may be electrically coupled between a first terminal of one of the middle two antenna elements 911 and a first terminal of the other of the middle two antenna elements 911, and another first phase tuning module 660 (e.g., the lower first phase tuning module 660) may be electrically coupled between a second terminal of the one of the middle two antenna elements 911 and a second terminal of the other of the middle two antenna elements 911. For example, the two first phase tuning module 660 may be electrically coupled to the T-combiners 912 which are electrically coupled between the middle two AEs 911 as shown by 920 in FIG. 9.

In some embodiments, the sub-array 930 may comprise three antenna elements 911 in a 3×1 form and any two adjacent antenna elements 911 may be electrically coupled to each other (e.g., via the T-combiners 912). A first phase tuning module 620 (e.g., the upper first phase tuning module 620) may be electrically coupled between a first terminal of the middle antenna element 911 and a first terminal of an end antenna element 911, and another first phase tuning module 620 (e.g., the lower first phase tuning module 620) may be electrically coupled between a second terminal of the middle antenna element 911 and a second terminal of the end antenna element 911. For example, the two first phase tuning module 620 may be electrically coupled to the T-combiners 912 which are electrically coupled between the middle AE 911 and the end AE 911 as shown by 930 in FIG. 9.

In some embodiments, the sub-array 940 may comprise two antenna elements 911 in a 2×1 form and the two antenna elements 911 may be electrically coupled to each other (e.g., via the T-combiners 912). A first phase tuning module 610 (e.g., the upper first phase tuning module 610) may be electrically coupled between a first terminal of one of the two antenna elements 911 and a first terminal of the other of the two antenna elements 911, and another first phase tuning module 610 (e.g., the lower first phase tuning module 610) may be electrically coupled between a second terminal of the one of the two antenna elements 911 and a second terminal of the other of the two antenna elements 911. For example, the two first phase tuning module 610 may be electrically coupled to the T-combiners 912 which are electrically coupled between the two AE 911 as shown by 940 in FIG. 9.

In some embodiments, the sub-array 950 may comprise two antenna elements 911 in a 2×1 form and the two antenna elements 911 may be electrically coupled to each other (e.g., via the T-combiner 912*s*). A first phase tuning module 630

(e.g., the upper first phase tuning module 630) may be electrically coupled between a first terminal of one of the two antenna elements 911 and a first terminal of the other of the two antenna elements 911, and another first phase tuning module 630 (e.g., the lower first phase tuning module 630) may be electrically coupled between a second terminal of the one of the two antenna elements 911 and a second terminal of the other of the two antenna elements 911. For example, the two first phase tuning module 630 may be electrically coupled to the T-combiners 912 which are electrically coupled between the two AE 911 as shown by 950 in FIG. 9.

Figure 10:
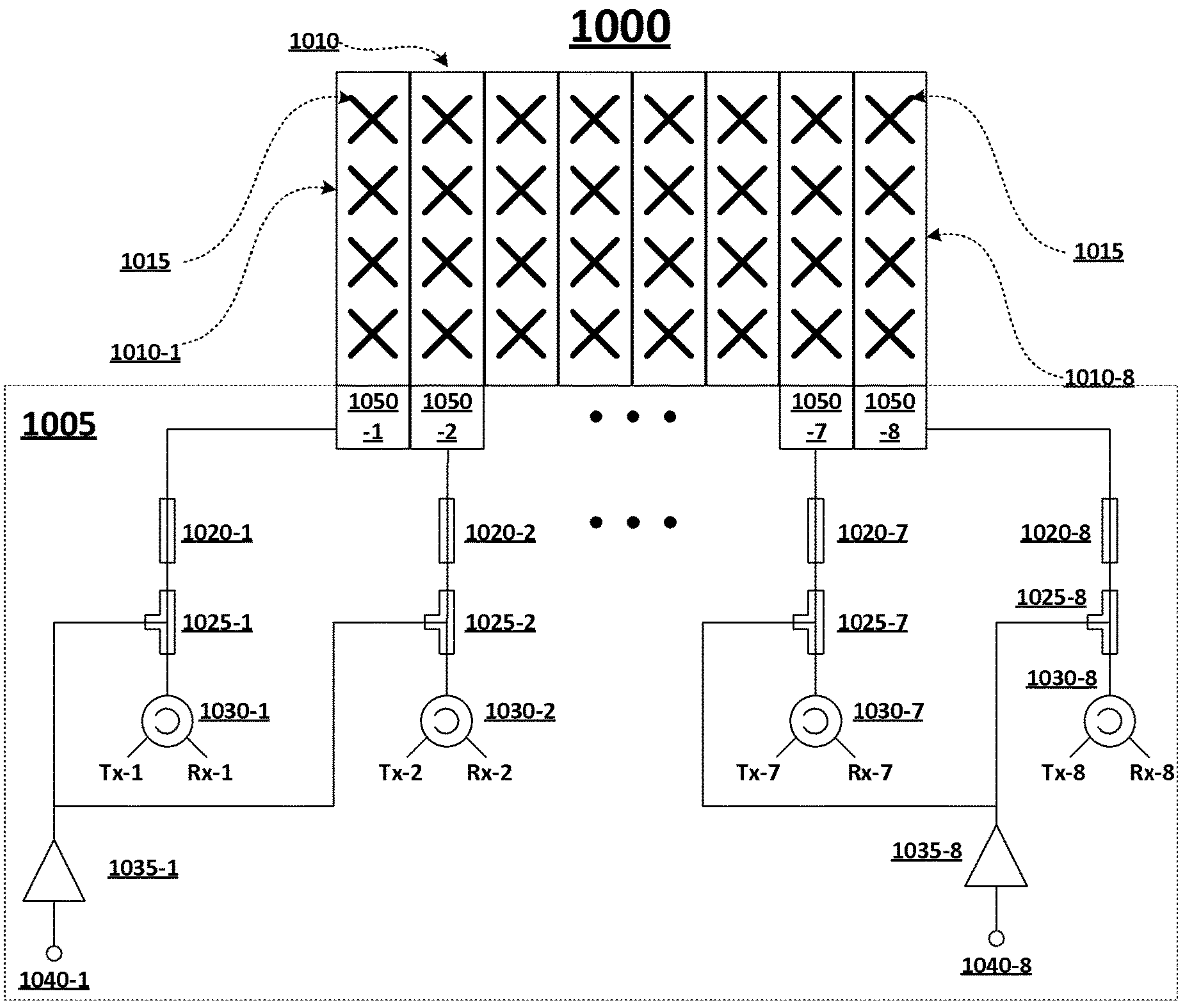
FIG. 10 is a schematic diagram illustrating another exemplary antenna system according to another embodiment of the present disclosure.

FIG. 10 is a schematic diagram illustrating another exemplary antenna system 1000 according to another embodiment of the present disclosure. As shown in FIG. 10, the antenna system 1000 may comprise an antenna array 1010 comprising one or more sub-arrays 1010-1 to 1010-8 of antenna elements (AEs) 1015. The antenna array 1010 is substantially similar to the antenna array 410 shown in FIG. 4, and the detailed description thereof is omitted for simplicity.

Further, the antenna system 1000 may further comprise a state switching circuit 1005 electrically coupled to the at least one of the sub-arrays 1010-1 to 1010-8 and configured to drive the at least one of the sub-array 1010-1 to 1010-8 to operate in a first state in which an upper side lobe of the antenna array is suppressed for a first beam tilting range or in a second state in which an upper side lobe of the antenna array is suppressed for a second beam tilting range which is different from the first beam tilting range.

As also shown in FIG. 10, for the sub-arrays 1010-1, the state switching circuit 1005 may comprise a bias-T 1025-1. As shown in FIG. 10, the bias-T 1025-1 may have a first terminal (e.g., the low-frequency port) electrically coupled to a driver integrated chip (IC) 1035-1 to receive a control signal from the driver IC 1035-1, a second terminal (e.g., the high-frequency port) electrically coupled to a specific Tx/Rx chain or channel (i.e., Tx-1/Rx-1) 1030-1 of a transceiver to receive/transmit a radio frequency (RF) signal from/to the transceiver, and a third terminal (e.g., the combined port) electrically coupled to a first terminal of a phase tuning circuit 1050-1 to communicate the control signal and the RF signal with the phase tuning circuit 1050-1. Further, the phase tuning circuit 1050 may have its first terminal electrically coupled to the third terminal of the bias-T 1025-1 and one or more second terminals electrically coupled to each of the antenna elements 1015 of the at least one sub-array 1010-1, respectively. In other words, the bias-T 1025-1, the driver IC 1035-1, and the Tx/Rx channel 1030-1 may function in a similar manner to the bias-T 425-1, the driver IC 435-1, and the Tx/Rx channel 430-1 shown in FIG. 4, and therefore the description thereof is omitted for simplicity.

The embodiment shown in FIG. 10 differs from that shown in FIG. 4 at least in that the driver IC 1035-1 may provide the control signal to other bias-T (e.g. the bias-T 1025-2 shown in FIG. 10) in addition to its corresponding bias-T 1025-1. In other words, two or more of the sub-arrays 1010-1 to 1010-8 may share a same driver IC 1035-1 in the embodiment shown in FIG. 10 while there is one driver IC for each of the sub-arrays 410-1 to 410-8 in the embodiment shown in FIG. 4. To be specific, the bias-T 1025-2 may have its first terminal (e.g., the low-frequency port) electrically coupled to the driver IC 1035-1 to receive the control signal as well.

As shown in FIG. 10, the sub-array 1010-1 and the sub-array 1010-2 may share the same driver-IC 1035-1, and the sub-array 1010-7 and the sub-array 1010-8 may share the same driver-IC 1035-8. Although not shown, the sub-array 1010-3 and the sub-array 1010-4 may share the same driver-IC 1035-3, and the sub-array 1010-5 and the sub-array 1010-6 may share the same driver-IC 1035-6 in a similar manner. However, the present disclosure is not limited thereto. For example, all the sub-arrays 1010-1 to 1010-8 may share a same driver IC, or share two or more driver ICs in various manners.

In this way, the control circuits on the radio board, which can reconfigure the sub-arrays' states, may be composed of digital I/Os (e.g., 1040), the driver IC (e.g., 1035), the bias-Ts (e.g., 1025) and/or the board-to-board connectors (e.g., 1020). Such an exemplary architecture may allow the minimum change of the base station's mechanical structure. Further, in some embodiments, additional I/O cables may be required between the antenna array and the radio board. In some embodiments, the sub-arrays of the antenna array are electrically coupled to the driver IC through a first number of bias-T with one driver IC for one sub-array. In some embodiments, the sub-arrays of the antenna array are electrically coupled to the driver IC through a second number of bias-T with one driver IC for multiple sub-arrays.

Figure 11:
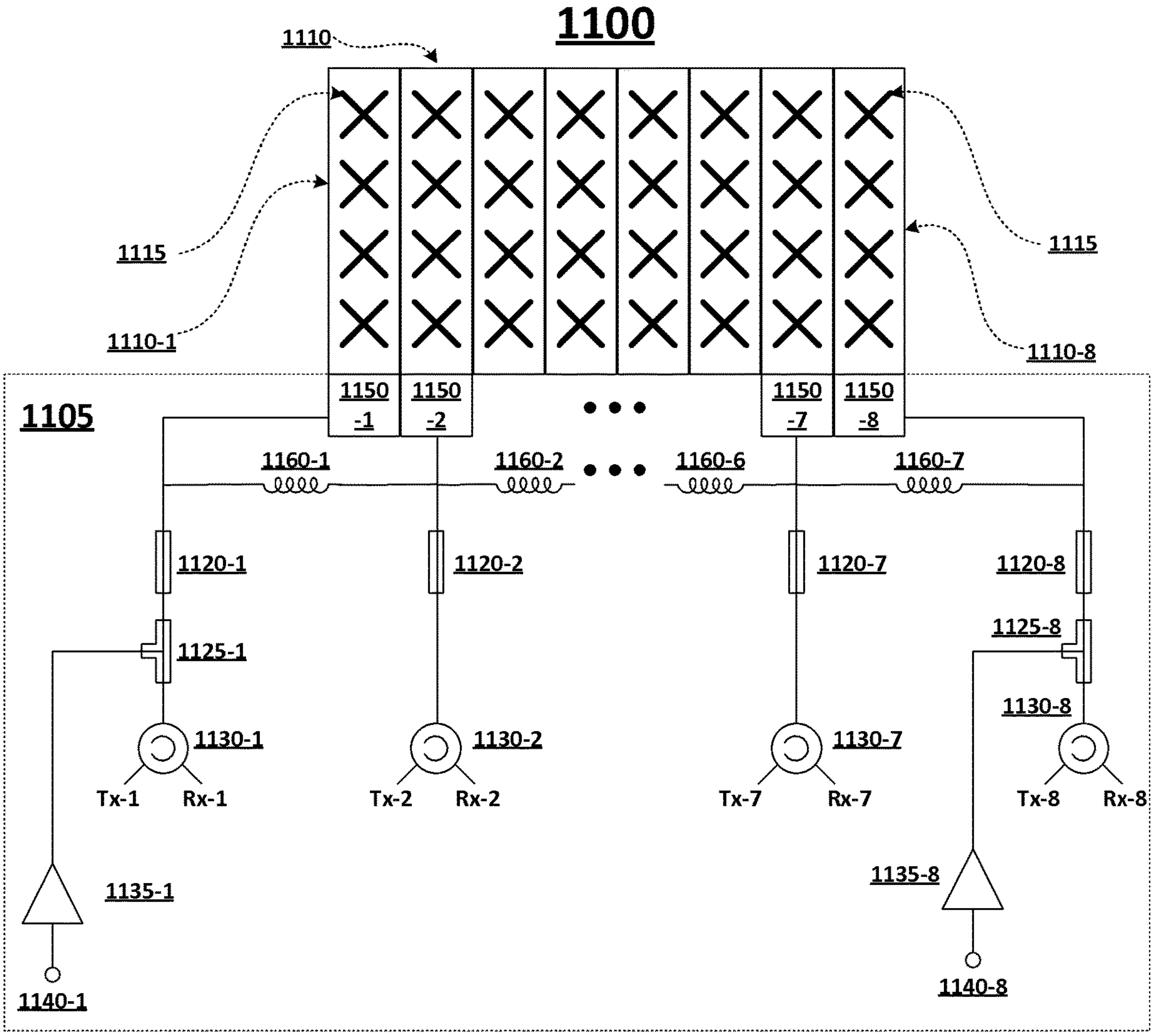
FIG. 11 is a schematic diagram illustrating yet another exemplary antenna system according to yet another embodiment of the present disclosure.

FIG. 11 is a schematic diagram illustrating yet another exemplary antenna system 1100 according to yet another embodiment of the present disclosure. As shown in FIG. 11, the antenna system 1100 may comprise an antenna array 1110 comprising one or more sub-arrays 1110-1 to 1110-8 of antenna elements (AEs) 1115. The antenna array 1110 is substantially similar to the antenna array 411 shown in FIG. 4, and the detailed description thereof is omitted for simplicity.

Further, the antenna system 1100 may further comprise a state switching circuit 1105 electrically coupled to the at least one of the sub-arrays 1110-1 to 1110-8 and configured to drive the at least one of the sub-array 1110-1 to 1110-8 to operate in a first state in which an upper side lobe of the antenna array is suppressed for a first beam tilting range or in a second state in which an upper side lobe of the antenna array is suppressed for a second beam tilting range which is different from the first beam tilting range.

As also shown in FIG. 11, for the sub-arrays 1110-1, the state switching circuit 1105 may comprise a bias-T 1125-1. As shown in FIG. 11, the bias-T 1125-1 may have a first terminal (e.g., the low-frequency port) electrically coupled to a driver integrated chip (IC) 1135-1 to receive a control signal from the driver IC 1135-1, a second terminal (e.g., the high-frequency port) electrically coupled to a specific Tx/Rx chain or channel (i.e., Tx-1/Rx-1) 1130-1 of a transceiver to receive/transmit a radio frequency (RF) signal from/to the transceiver, and a third terminal (e.g., the combined port) electrically coupled to a first terminal of a phase tuning circuit 1150-1 to communicate the control signal and the RF signal with the phase tuning circuit 1150-1. Further, the phase tuning circuit 1150 may have its first terminal electrically coupled to the third terminal of the bias-T 1125-1 and one or more second terminals electrically coupled to each of the antenna elements 1115 of the at least one sub-array 1110-1, respectively. In other words, the bias-T 1125-1, the driver IC 1135-1, and the Tx/Rx channel 1130-1 may function in a similar manner to the bias-T 425-1, the driver IC 435-1, and the Tx/Rx channel 430-1 shown in FIG. 4, and therefore the description thereof is omitted for simplicity.

The embodiment shown in FIG. 11 differs from that shown in FIG. 4 at least in that the control signal provided from the driver IC 1135-1 may also be provided to the sub-array 1110-2 via an inductor 1160-1 and the phase tuning circuit 1150-2. In other words, two or more of the sub-arrays 1110-1 to 1111-8 may share the same driver IC 1135-1 and the same bias-T 1125-1 in the embodiment shown in FIG. 11 while there is one driver IC and one bias-T for each of the sub-arrays 411-1 to 411-8 in the embodiment shown in FIG. 4. To be specific, the phase tuning module 1150-2 may have its first terminal electrically coupled to the board-to-board connector 1120-1 to receive the low-frequency control signal without receiving the high-frequency RF signal provided by the Tx-1/Rx-1 1130-1.

As shown in FIG. 11, the sub-array 1110-1 and the sub-array 1110-2 may share the same driver-IC 1135-1 and the same bias-T 1125-1, and the sub-array 1110-7 and the sub-array 1110-8 may share the same driver-IC 1135-8 and the same bias-T 1125-8. Although not shown, the sub-array 1111-3, the sub-array 1111-4, the sub-array 1111-5 and/or the sub-array 1111-6 may also share the same driver-ICs 1135-1 and 1135-8 and the same bias-Ts 1125-1 and 1125-8 for the control signal. However, the present disclosure is not limited thereto. In some other embodiments, the sub-arrays 1110-1 to 1110-8 may share the same driver-ICs 1135-1 and the same bias-Ts 1125-1. In some other embodiments, the sub-arrays 1110-1 and 1110-2 may share the same driver-ICs 1135-1 and the same bias-Ts 1125-1, the sub-arrays 1110-3 and 1110-4 may share the same driver-ICs 1135-3 and the same bias-Ts 1125-3, the sub-arrays 1110-5 and 1110-6 may share the same driver-ICs 1135-5 and the same bias-Ts 1125-5, and the sub-arrays 1110-7 and 1110-8 may share the same driver-ICs 1135-7 and the same bias-Ts 1125-7. In other words, the sharing of the driver-ICs and/or the bias-Ts by the sub-arrays may be changed for different cases. In some embodiments, the sub-arrays of the antenna array are electrically coupled to the driver IC through a first number of bias-T with one bias-T for one sub-array. In some embodiments, the sub-arrays of the antenna array are electrically coupled to the driver IC through a second number of bias-T with one bias-T for multiple sub-arrays.

In other words, the number of the control circuits may be determined by the demand. The minimum number of the circuits may be "one set of control circuits only" if the radio requires the antenna to change between two states. Further, the maximum number of the control circuits may be equal to the number of T/R channels if necessary.

Further, for an existing platform, both Tx and Rx may see the 4×1 sub-arrays, and the phase tuning density at Tx and Rx are both "¼". By contrast, for a platform according to some embodiments of the present disclosure, the Tx may see 2×1 sub-array and report phase tuning density of "½". Further, the Rx may see 4×1 sub-array and report phase tuning density of "¼". Therefore, arrays with phase tuning density of "½" may report better upper-SLS ratio when compared with arrays with phase tuning density of "¼" of the existing platform. By introducing the reconfigurable sub-array, a software-definable antenna aperture may be provided, and it is compatible with the current base station and improves radiation performance at a low cost.

Figure 12:
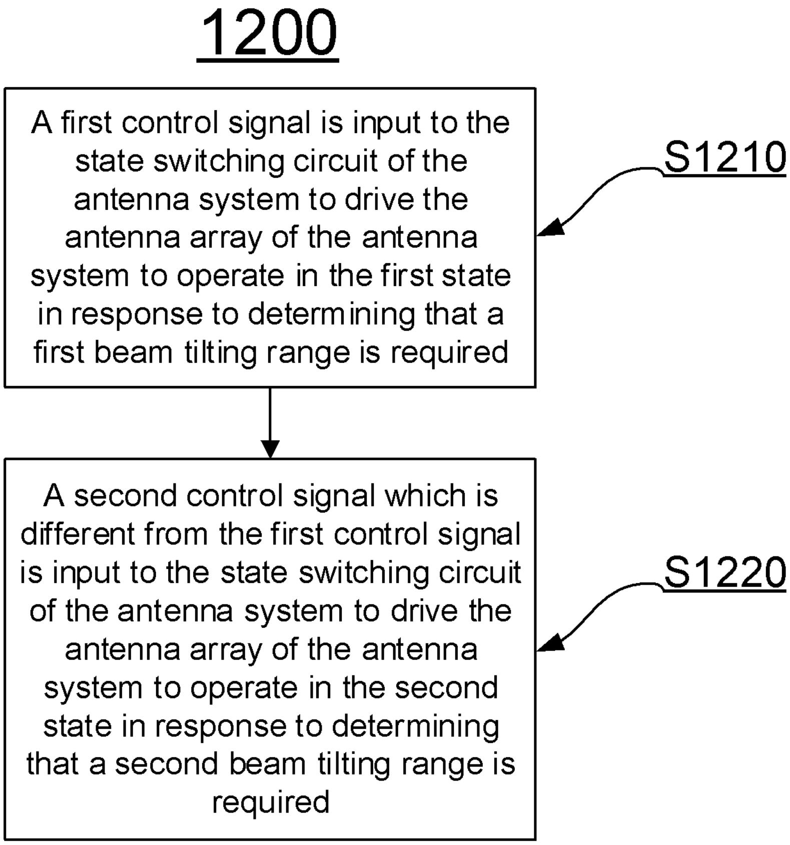
FIG. 12 is a flow chart illustrating an exemplary method of operating an antenna system according to an embodiment of the present disclosure.

FIG. 12 is a flow chart illustrating an exemplary method 1200 of operating an antenna system according to an embodiment of the present disclosure. The method 1200 may be performed by a base station (e.g., a gNB or an eNB), to be more specific, by a host processor, a driver IC (e.g., the driver ICs 435-1 to 435-8). The method 1200 may comprise step S1210 and step S1220. However, the present disclosure is not limited thereto. In some other embodiments, the method 1200 may comprise more steps, less steps, different steps or any combination thereof. Further the steps of the method 1200 may be performed in a different order than that described herein. Further, in some embodiments, a step in the method 1200 may be split into multiple sub-steps and performed by different entities, and/or multiple steps in the method 1200 may be combined into a single step.

The method 1200 may begin at step S1210 where a first control signal may be input to the state switching circuit of the antenna system to drive the antenna array of the antenna system to operate in the first state in response to determining that a first beam tilting range is required.

At step S1220, a second control signal which is different from the first control signal may be input to the state switching circuit of the antenna system to drive the antenna array of the antenna system to operate in the second state in response to determining that a second beam tilting range is required.

With this method, the antenna system according to some embodiments of the present disclosure may be operated in different states corresponding to different down-tilting ranges, such that the upper side lobe suppression may not conflict with the antenna gain. Further, a continuous beam sweeping may be achieved.

Figure 13:
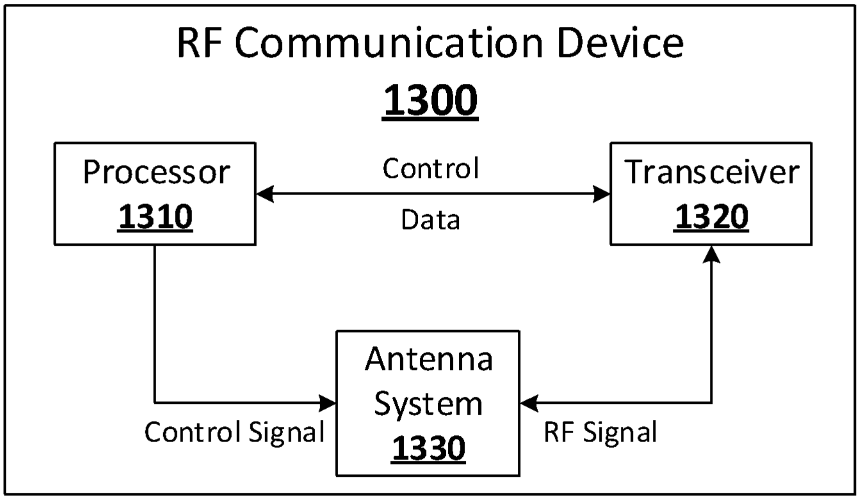
FIG. 13 is a block diagram illustrating an exemplary RF communication device according to an embodiment of the present disclosure.

FIG. 13 is a block diagram illustrating an exemplary RF communication device 1300 according to an embodiment of the present disclosure. As shown in FIG. 13, the RF communication device 1300 may comprise a processor 1310, a transceiver 1320, and an antenna system 1330 which may be electrically coupled to each other.

In some embodiments, the antenna system 1330 may be any of the above mentioned antenna systems, such as, 400, 1000, and 1100. In some embodiments, the transceiver 1320 may be configured to transmit/receive an RF signal to/from the antenna system 1330. In some embodiments, the processor 1310 may be configured to coordinate the antenna system 1330 and the transceiver 1320 to suppress its upper side lobe based on a beam tilting range intended by the transceiver 1320. For example, the processor 1310 may control the antenna system 1330 to be operated in different states by issuing different control signals, respectively, for example, upon reception of a request from the transceiver 1320. However, the present disclosure is not limited thereto. In some other embodiments, the control signal may be issued by the transceiver 1320 itself rather than by the processor 1310. Further, in some embodiments, the RF communication device 1300 may be a base station, an eNB, a gNB, or any other RF communication device.

Figure 14:
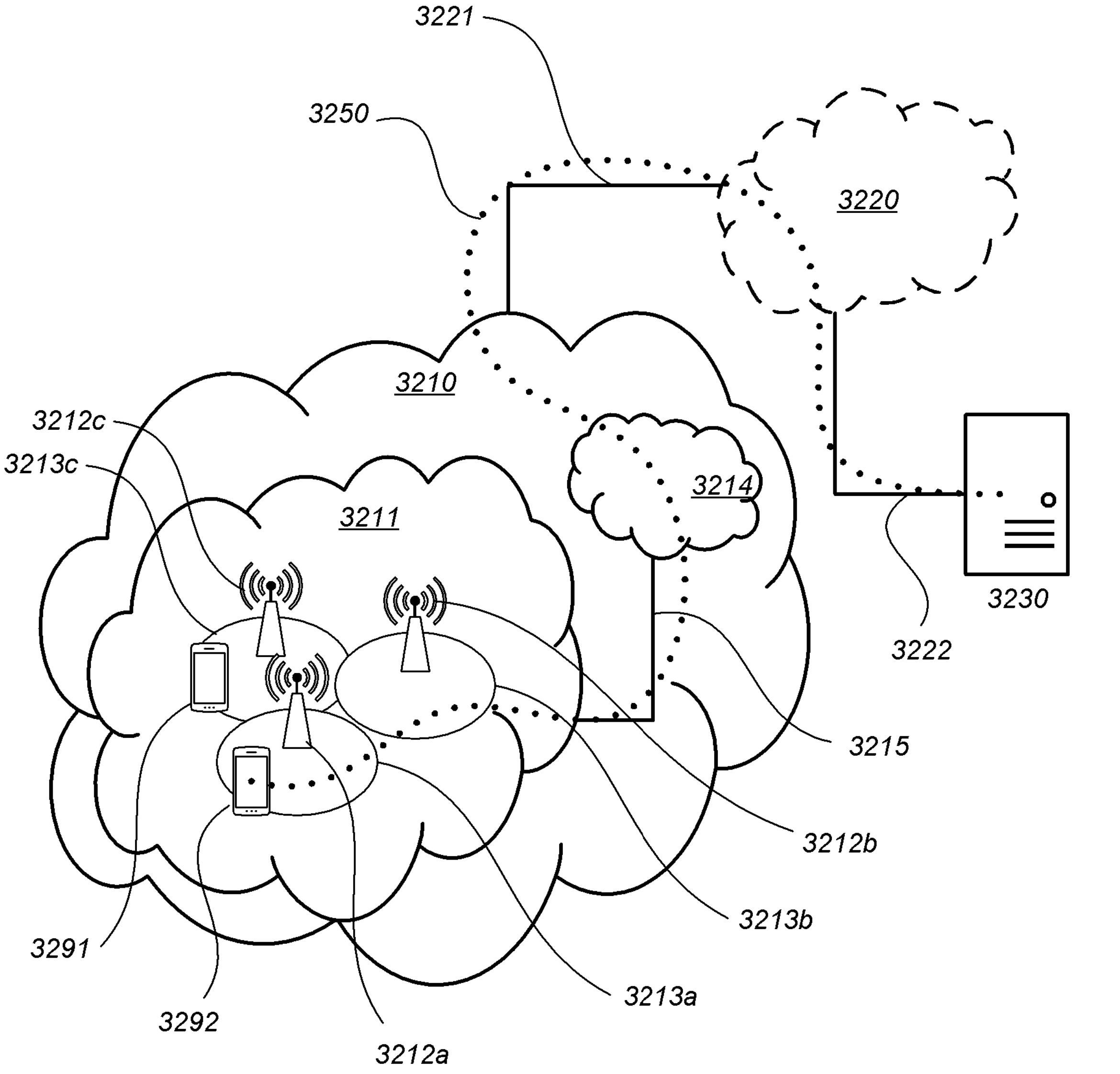
FIG. 14 schematically illustrates a telecommunication network connected via an intermediate network to a host computer.

With reference to FIG. 14, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212*a*, 3212*b*, 3212*c*, such as NBs, eNBs, gNBs or other types of wireless access points, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) 3291 located in coverage area 3213*c* is configured to wirelessly connect to, or be paged by, the corresponding base station 3212*c*. A second UE 3292 in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 14 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 15. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 15) served by the base station 3320. The communication interface 3326 may be configured to facilitate a connection 3360 to the host computer 3310. The connection 3360 may be direct or it may pass through a core network (not shown in FIG. 15) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 15:
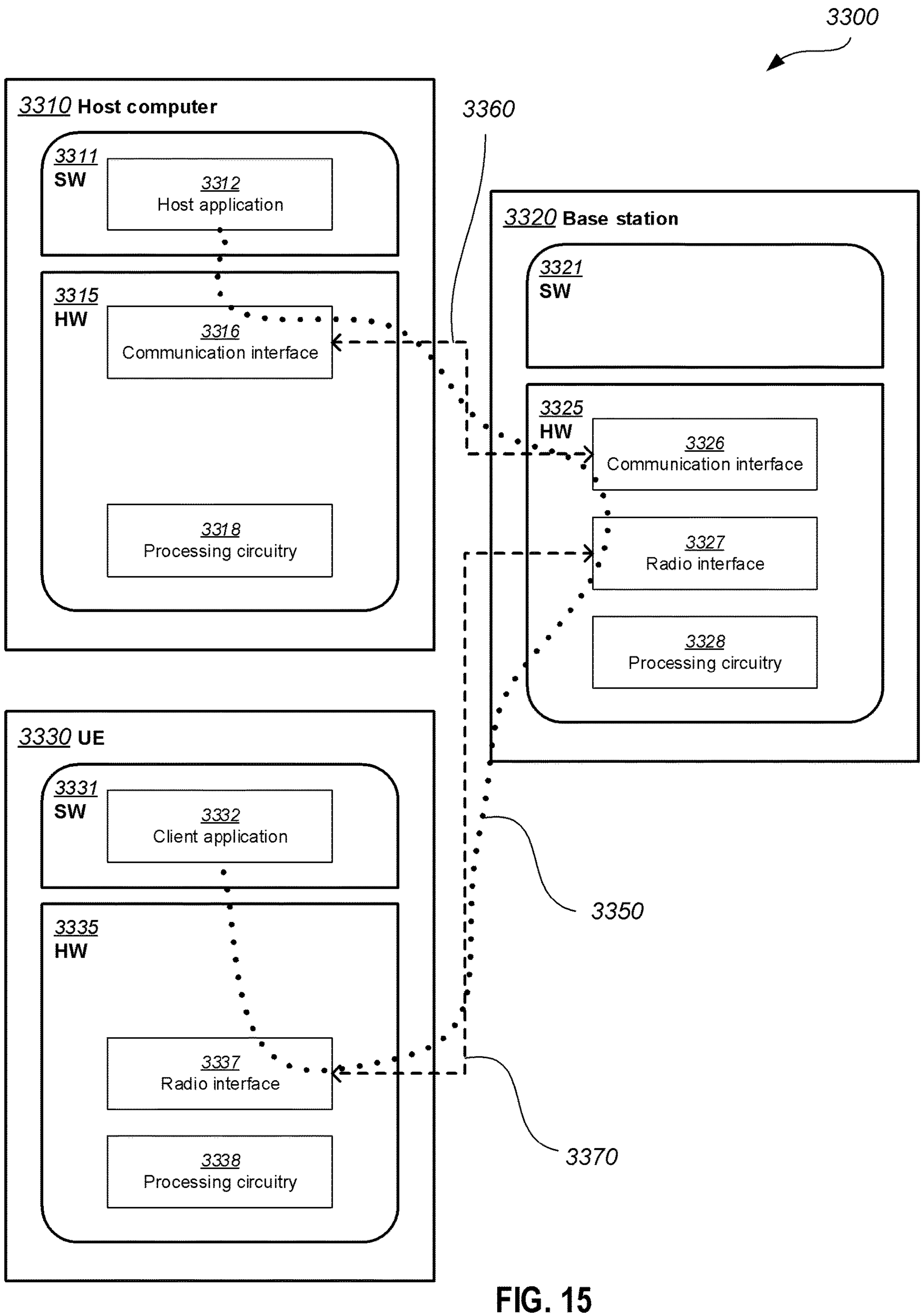
FIG. 15 is a generalized block diagram of a host computer communicating via a base station with a user equipment over a partially wireless connection.

It is noted that the host computer 3310, base station 3320 and UE 3330 illustrated in FIG. 15 may be identical to the host computer 3230, one of the base stations 3212*a*, 3212*b*, 3212*c* and one of the UEs 3291, 3292 of FIG. 14, respectively. This is to say, the inner workings of these entities may be as shown in FIG. 15 and independently, the surrounding network topology may be that of FIG. 14.

In FIG. 15, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate, latency, power consumption and thereby provide benefits such as reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 16:
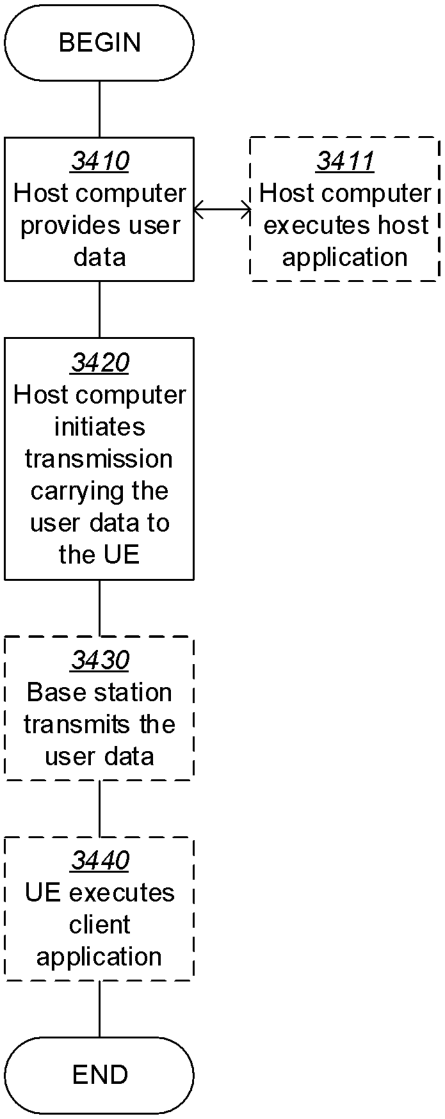
FIGS. 16 to 19 are flowcharts illustrating methods implemented in a communication system including a host computer, a base station and a user equipment.

FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

Figure 17:
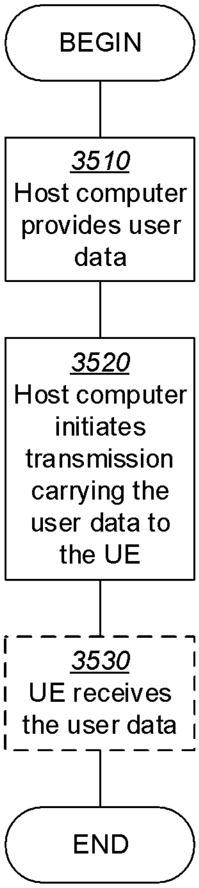

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figure 18:
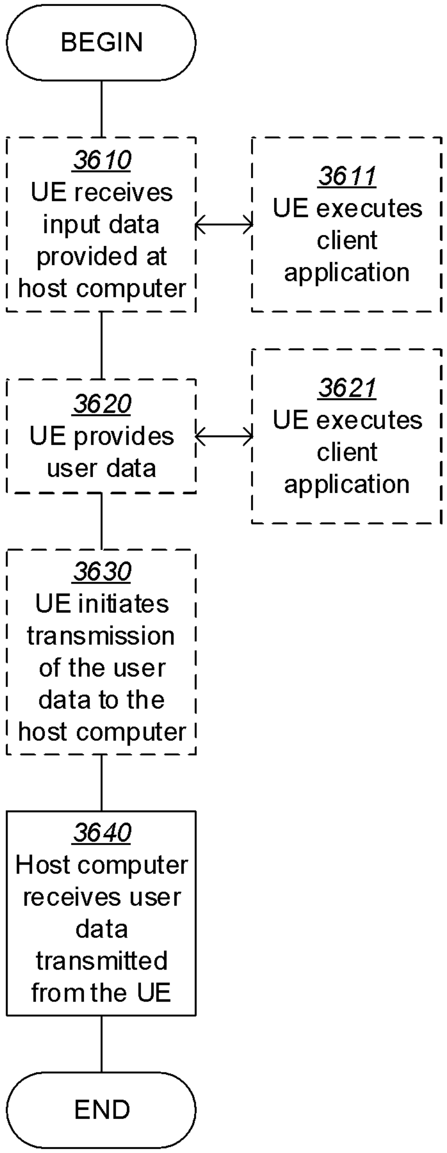

FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

Figure 19:
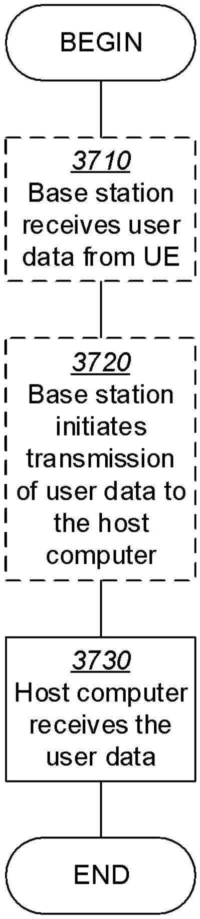

FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

The disclosure has been described with reference to embodiments and drawings. It should be understood that various modifications, alternations and additions can be made by those skilled in the art without departing from the spirits and scope of the disclosure. Therefore, the scope of the disclosure is not limited to the above particular embodiments but only defined by the claims as attached and equivalents thereof.

| Abbreviation | Explanation |
|---|---|
| AE | Antenna Element |
| Tx | transmitting |
| Rx | receiving |
| upper-SLS | upper-side-lobe-suppression |
| RET | remote electronic tilt |

What is claimed is:

1. An antenna system, the antenna system comprising:

an antenna array comprising one or more sub-arrays of antenna elements in which at least one sub-array being operable in more than one state; and a state switching circuit electrically coupled to the at least one sub-array and configured to drive the at least one sub-array to operate in a first state in which an upper side lobe of the antenna array is suppressed for a first beam tilting range or in a second state in which the upper side lobe of the antenna array is suppressed for a second beam tilting range which is different from the first beam tilting range;

wherein the state switching circuit comprises:

a bias-T has a first terminal electrically coupled to a driver integrated chip (IC) to receive a control signal from the driver IC, a second terminal electrically coupled to a transceiver to receive/transmit a radio frequency (RF) signal from/to the transceiver, and a third terminal electrically coupled to a first terminal of a phase tuning circuit to communicate the control signal and the RF signal with the phase tuning circuit; and the phase tuning circuit having a first terminal electrically coupled to the third terminal of the bias-T and one or more second terminals electrically coupled to each of the antenna elements of the at least one sub-array, respectively, wherein the phase tuning circuit is configured to tune the phase of the RF signal, which passes through the phase tuning circuit, based on the control signal.

2. The antenna system of claim 1, wherein the phase tuning circuit comprises one or more first phase tuning modules, wherein each of the first phase tuning modules has two terminals and configured to communicate the RF signal with its phase tuned based on the control signal received from one of the two terminals.

3. The antenna system of claim 1, wherein a first phase tuning module comprises:

a first PIN diode having a first terminal electrically coupled to a first terminal of an inductor and a second terminal serving as the terminals of the first phase tuning module;

a first stub having a first terminal electrically coupled to the first terminal of the first PIN diode and a second terminal floated;

a second PIN diode having a first terminal electrically coupled to the first terminal of the inductor and a second terminal electrically coupled to the second terminal of the first PIN diode;

a second stub having a first terminal electrically coupled to the first terminal of the second PIN diode and a second terminal floated; and the inductor having the first terminal electrically coupled to the first terminal of the first PIN diode and the first terminal of the second PIN diode and a second terminal electrically coupled to the ground.

4. The antenna system of claim 1, wherein a first phase tuning module comprises:

a first PIN diode having a first terminal electrically coupled to a first terminal of a first stub and a second terminal serving as the terminals of the first phase tuning module; and the first stub having the first terminal electrically coupled to the first terminal of the first PIN diode and a second terminal floated.

5. The antenna system of claim 1, wherein a first phase tuning module comprises:

a first PIN diode having a first terminal serving as one terminal of the first phase tuning module and a second terminal serving as the other terminal of the first phase tuning module;

a first signal path having a first terminal electrically coupled to the first terminal of the first PIN diode and a second terminal electrically coupled to a second terminal of a second PIN diode;

a second signal path having a first terminal electrically coupled to the second terminal of the first PIN diode and a second terminal electrically coupled to a first terminal of the second PIN diode; and the second PIN diode having the first terminal electrically coupled to the second terminal of the second signal path and the second terminal electrically coupled to the second terminal of the first signal path.

6. The antenna system of claim 1, wherein a first phase tuning module comprises:

a first PIN diode having a first terminal serving as one terminal of the first phase tuning module and a second terminal serving as the other terminal of the first phase tuning module; and a first bridging conductor trace having a first terminal electrically coupled to the first terminal of the first PIN diode and a second terminal electrically coupled to the second terminal of the first PIN diode.

7. The antenna system of claim 1, wherein a first phase tuning module comprises:

a first PIN diode having a first terminal electrically coupled to a first terminal of a first signal path and a second terminal serving as one terminal of the first phase tuning module (650);

the first signal path having the first terminal electrically coupled to the first terminal of the first PIN diode and a second terminal electrically coupled to a first terminal of a second PIN diode;

the second PIN diode having the first terminal electrically coupled to the second terminal of the first signal path and a second terminal serving as the other terminal of the first phase tuning module;

a third PIN diode having a first terminal electrically coupled to the second terminal of the first PIN diode and a second terminal electrically coupled to a first terminal of a second signal path; and the second signal path having the first terminal electrically coupled to the second terminal of the third PIN diode and a second terminal electrically coupled to a second terminal of a fourth PIN diode;

the fourth PIN diode having a first terminal electrically coupled to the second terminal of the second PIN diode and the second terminal electrically coupled to the second terminal of the second signal path.

8. The antenna system of claim 1, wherein a first phase tuning module comprises:

a first PIN diode having a first terminal electrically coupled to a first terminal of a first signal path and a second terminal serving as one terminal of the first phase tuning module;

the first signal path having the first terminal electrically coupled to the first terminal of the first PIN diode and a second terminal serving as the other terminal of the first phase tuning module;

a second PIN diode having a first terminal electrically coupled to the second terminal of the first PIN diode and a second terminal electrically coupled to a first terminal of a second signal path; and the second signal path having the first terminal electrically coupled to the second terminal of the second PIN diode and a second terminal electrically coupled to the second terminal of the first signal path.

9. The antenna system of claim 1, wherein the phase tuning circuit is composed of one or more first phase tuning modules, one or more second phase tuning modules, or a combination thereof.

10. The antenna system of claim 1, wherein the phase tuning circuit comprises one or more second phase tuning modules, wherein each of the second phase tuning modules has three terminals and configured to communicate the RF signal with its phase tuned based on the control signal received from one of the three terminals.

11. The antenna system of claim 10, wherein a second phase tuning module comprises:

a first PIN diode having a first terminal electrically coupled to a first terminal of a first signal path and a second terminal serving as a first terminal of the second phase tuning module;

the first signal path having a first terminal electrically coupled to the first terminal of the first PIN diode and a second terminal serving as a second terminal of the second phase tuning module;

a second PIN diode having a first terminal electrically coupled to the second terminal of the first PIN diode and a second terminal electrically coupled to a first terminal of a second signal path;

the second signal path having the first terminal electrically coupled to the second terminal of the second PIN diode and a second terminal serving as a third terminal of the second phase tuning module; and a third signal path having a first terminal electrically coupled to the first terminal of the second signal path and a second terminal electrically coupled to the first terminal of the first signal path.

12. The antenna system of claim 10, wherein a second phase tuning module comprises:

a first PIN diode having a first terminal electrically coupled to a first terminal of a first signal path and a second terminal serving as a first terminal of the second phase tuning module;

the first signal path having the first terminal electrically coupled to the first terminal of the first PIN diode and a second terminal serving as a second terminal (698) of the second phase tuning module;

a second PIN diode having a first terminal electrically coupled to a first terminal of a second signal path and a second terminal electrically coupled to the second terminal of the first PIN diode;

the second signal path having the first terminal electrically coupled to the first terminal of the second PIN diode and a second terminal serving as a third terminal of the second phase tuning module;

a third signal path having a first terminal electrically coupled to the first terminal of the first PIN diode and a second terminal electrically coupled to a first terminal of a first capacitor;

the first capacitor having the first terminal electrically coupled to the second terminal of the third signal path and a second terminal electrically coupled to a first terminal of a fifth signal path;

a fourth signal path having a first terminal electrically coupled to the first terminal of the second PIN diode and a second terminal electrically coupled to a second terminal of a second capacitor;

the second capacitor having a first terminal electrically coupled to a second terminal of the fifth signal path and the second terminal electrically coupled to the second terminal of the fourth signal path;

the fifth signal path having the first terminal electrically coupled to the second terminal of the first capacitor and the second terminal electrically coupled to the first terminal of the second capacitor;

a first inductor having a first terminal electrically coupled to a first voltage signal terminal and a second terminal electrically coupled to the second terminal of the first signal path;

a second inductor having a first terminal electrically coupled to a third voltage signal terminal and a second terminal electrically coupled to the second terminal of the second signal path;

a third PIN diode having a first terminal electrically coupled to a second terminal of a third inductor and a second terminal electrically coupled to the second terminal of the first PIN diode; and the third inductor having a first terminal electrically coupled to a second voltage signal terminal and the second terminal electrically coupled to the first terminal of the third PIN diode.

13. The antenna system of claim 1, wherein the third terminal of the bias-T is electrically coupled to the first terminal of the phase tuning circuit through a board-to-board connector.

14. The antenna system of claim 1, wherein the sub-arrays of the antenna array are electrically coupled to the driver IC through a first number of bias-T with one driver IC for one sub-array.

15. The antenna system of claim 1, wherein the sub-arrays of the antenna array are electrically coupled to the driver IC through a second number of bias-T with one driver IC for multiple sub-arrays.

16. The antenna system of claim 1, wherein the sub-arrays of the antenna array are electrically coupled to the driver IC through a first number of bias-T with one bias-T for one sub-array.

17. The antenna system of claim 1, wherein the sub-arrays of the antenna array are electrically coupled to the driver IC through a second number of bias-T with one bias-T for multiple sub-arrays.

18. An RF communication device, comprising:

the antenna system according to claim 1;

a transceiver electrically coupled to the antenna system and configured to transmit/receive an RF signal to/from the antenna system; and a processor electrically coupled to the antenna system and the transceiver and configured to coordinate the antenna system and the transceiver to suppress its the upper side lobe based on a beam tilting range intended by the transceiver.

19. A method of operating the antenna system of claim 1, the method comprising:

inputting, to the state switching circuit of the antenna system, a first control signal, to drive the antenna array of the antenna system to operate in the first state in response to determining that the first beam tilting range is required; and inputting, to the state switching circuit of the antenna system, a second control signal which is different from the first control signal, to drive the antenna array of the antenna system to operate in the second state in response to determining that the second beam tilting range is required.

* * * * *